US012619768B2

(12) United States Patent (10) Patent No.: US 12,619,768 B2

Ankrom et al. (45) Date of Patent: May 5, 2026

(54) PORTABLE ACCESS POINT FOR SECURE USER INFORMATION USING NON-FUNGIBLE TOKENS

(71) Applicant: Oracle International Corporation, Redwood Shores, CA (US)

(72) Inventors: Zachary S. Ankrom, Austin, TX (US); Kamran Khaliq, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 196 days.

(21) Appl. No.: 18/182,919

(22) Filed: Mar. 13, 2023

(65) Prior Publication Data

US 2024/0126919 A1 Apr. 18, 2024

Related U.S. Application Data

(60) Provisional application No. 63/417,321, filed on Oct. 18, 2022.

(51) Int. Cl.

| | |
|---|---|
| *G06F 21/62* | (2013.01) |
| *H04L 9/00* | (2022.01) |
| *H04L 9/32* | (2006.01) |

(52) U.S. Cl.

CPC ........ *G06F 21/6245* (2013.01); *H04L 9/3213* (2013.01); *H04L 9/50* (2022.05)

(58) Field of Classification Search

CPC ..... G06F 21/6245; H04L 9/3213; H04L 9/50; H04L 9/3239

See application file for complete search history.

(56) References Cited

U.S. PATENT DOCUMENTS

| | | | |
|---|---|---|---|
| 8,275,632 | B2 | 9/2012 | Awaraji et al. |
| 9,855,785 | B1 | 1/2018 | Nagelberg et al. |

(Continued)

FOREIGN PATENT DOCUMENTS

| | | |
|---|---|---|
| KR | 20220129245 A | 9/2022 |

OTHER PUBLICATIONS

International Search Report and Written Opinion for International Application No. PCT/US2023/032871 dated Dec. 4, 2024.

(Continued)

*Primary Examiner* — Andrew Suh

(74) *Attorney, Agent, or Firm* — Potomac Law Group, PLLC

(57) ABSTRACT

Embodiments permit scope limited access to a user's secure information using non-fungible tokens (NFTs). A user can register with a secure information manager and control the scope with which the user's secure information is shared. For example, the user can permit a vetted entity access to the user's secure information via a portable access point. The user can select scope definition that control how the user's secure information is shared with the vetted entity. The vetted entity can scan the user's portable access point and request a credential. The credential can be a NFT that is assigned access privileges that correspond the user's selections. The vetted entity can then issue data access request(s) using the credential. The secure information manager can permit the vetted entity scope limited access to the user's secure information that corresponds to the access privileges assigned to the NFT.

20 Claims, 9 Drawing Sheets

(56)                References Cited

U.S. PATENT DOCUMENTS

| | | | |
|---|---|---|---|
| 11,063,770 | B1 | 7/2021 | Peng |
| 11,443,838 | B1 * | 9/2022 | Cordonnier ........... G16H 10/60 |
| 12,106,288 | B2 | 10/2024 | Andral |
| 2005/0076198 | A1 | 4/2005 | Skomra et al. |
| 2008/0172737 | A1 | 7/2008 | Shen et al. |
| 2012/0179490 | A1 | 7/2012 | Fuhrmann et al. |
| 2014/0219453 | A1 | 8/2014 | Neafsey et al. |
| 2014/0223523 | A1 | 8/2014 | Neafsey et al. |
| 2017/0076405 | A1 | 3/2017 | Shah |
| 2018/0211059 | A1 | 7/2018 | Aunger et al. |
| 2019/0356641 | A1 | 11/2019 | Isaacson et al. |
| 2020/0053081 | A1 | 2/2020 | Park et al. |
| 2020/0082139 | A1 | 3/2020 | Peeters |
| 2020/0168306 | A1 | 5/2020 | Chen et al. |
| 2020/0226285 | A1 | 7/2020 | Bulleit et al. |
| 2020/0334229 | A1 | 10/2020 | Harrison et al. |
| 2021/0044637 | A1 | 2/2021 | Lee et al. |
| 2021/0174972 | A1 | 6/2021 | Pavlatos et al. |
| 2021/0357893 | A1 | 11/2021 | Kang et al. |
| 2021/0366586 | A1 | 11/2021 | Ryan et al. |
| 2022/0035936 | A1 | 2/2022 | Lin |
| 2022/0123950 | A1 | 4/2022 | Erickson et al. |
| 2022/0150711 | A1 | 5/2022 | Lim et al. |
| 2022/0158997 | A1 | 5/2022 | Guinard et al. |
| 2022/0222364 | A1 * | 7/2022 | Roberts ................... G06F 21/64 |
| 2022/0374875 | A1 | 11/2022 | Madisetti et al. |
| 2023/0108610 | A1 * | 4/2023 | Tang .................. G06Q 20/3672 |
| | | | 705/66 |
| 2023/0118312 | A1 * | 4/2023 | Sun ...................... G06Q 20/389 |
| | | | 705/69 |
| 2023/0126016 | A1 | 4/2023 | Nelson |
| 2023/0130347 | A1 | 4/2023 | Ravinathan |
| 2023/0354020 | A1 | 11/2023 | Rule et al. |
| 2023/0403144 | A1 * | 12/2023 | Rhodin ................ H04L 9/3239 |
| 2023/0421399 | A1 | 12/2023 | Quirk et al. |
| 2024/0037539 | A1 * | 2/2024 | Nonni ................... H04L 9/3213 |
| 2024/0061951 | A1 | 2/2024 | Innanje et al. |
| 2024/0126919 | A1 | 4/2024 | Ankrom et al. |
| 2024/0220939 | A1 | 7/2024 | Ropel et al. |
| 2024/0221439 | A1 | 7/2024 | Ropel et al. |
| 2024/0275770 | A1 | 8/2024 | Agrawal et al. |
| 2024/0354866 | A1 | 10/2024 | Schwartz |
| 2024/0382493 | A1 | 11/2024 | Ankrom et al. |
| 2025/0131994 | A1 | 4/2025 | Gross et al. |
| 2025/0291948 | A1 | 9/2025 | Gnanasambandam et al. |

OTHER PUBLICATIONS

International Search Report and Written Opinion for International Application No. PCT/US2024/021434 dated Jun. 24, 2024.
International Search Report and Written Opinion for International Application No. PCT/US2024/021435 dated Jun. 24, 2024.
International Search Report and Written Opinion for International Application No. PCT/US2024/021921 dated Jul. 1, 2024.

* cited by examiner

QUERYING A SECURE DATA STORE FOR THE USER'S INFORMATION — 702

RECEIVING SCOPE LIMITED USER INFORMATION — 704

PROVIDING THE REQUESTING SYSTEM THE SCOPE LIMITED USER INFORMATION — 706

LOGGING THE REQUEST AND SCOPE LIMITED INFORMATION ACCESSED — 708

PROVIDING THE LOGGED DATA IN RESPONSE TO AN AUDIT REQUEST — 710

PORTABLE ACCESS POINT FOR SECURE USER INFORMATION USING NON-FUNGIBLE TOKENS

FIELD

The embodiments of the present disclosure generally relate to secure storage system(s) that permit scope limited access to a user's secure information using non-fungible token(s).

BACKGROUND

The proliferation of computing and connected devices has generated vast amounts of data that requires management. As data grows in size, the technological challenges related to efficiently managing the data has become increasingly complex. For example, sharing secure data among multiple parties has been a longstanding problem in the field of data management. Security techniques that permit a user to manage secure information, such as authentication, validation, and permission workflows, can be cumbersome and, in some scenarios, impractical. Security protocols that achieve practical secure data sharing in scenarios that cause friction for traditional data sharing protocols can provide substantial value.

SUMMARY

The embodiments of the present disclosure are generally directed to systems and methods for permitting limited access to a user's secure information using credential authentication and user information verification. A credential request for one or more credentials that permit access to a user's secure information can be received at a secure information manager, the request comprising user identifying information, entity identifying information, and a credential definition. The user identifying information and the entity identifying information can be validated by the secure information manager. In response to the validating, a non-fungible token that corresponds to the credential definition can be assigned to the entity, wherein the non-fungible token assignment is recorded on a private blockchain that manages the non-fungible token. In response to one or more access requests from the entity that comprises the assigned non-fungible token, scope limited access to the user's secure information can be permitted that corresponds to access permissions of the non-fungible token.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 4A, 4B, and 4C illustrate systems with a secure information manager that permit scope limited access to a user's secure information using non-fungible tokens according to an example embodiment.

DETAILED DESCRIPTION

Figure 1:
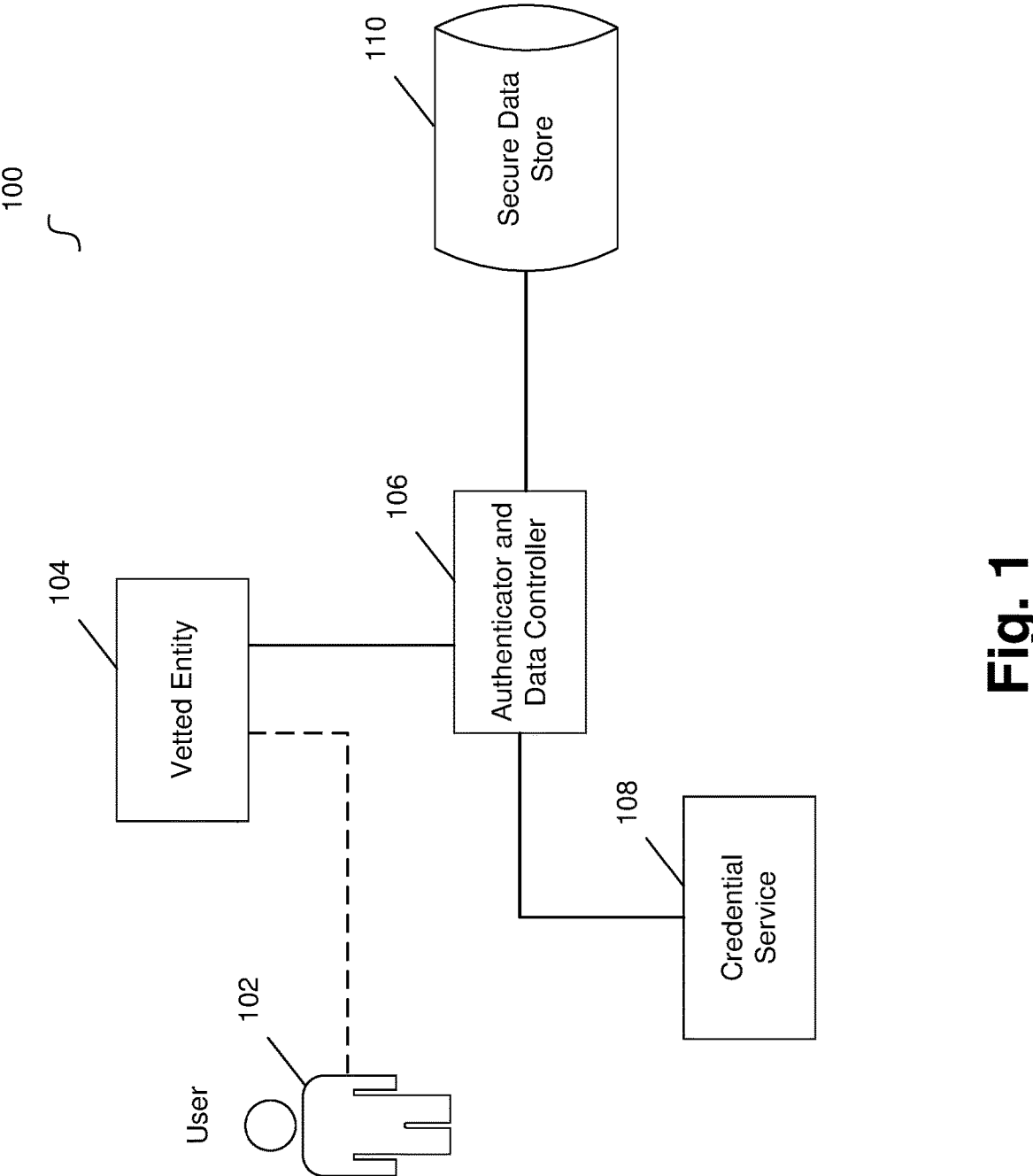
FIG. 1 illustrates a system for permitting scope limited access to a user's secure information using non-fungible tokens according to an example embodiment.

Embodiments permit scope limited access to a user's secure information using non-fungible tokens. A user can register with a secure information manager and control the scope with which the user's secure information is shared. The user can permit a vetted entity (e.g., service provider, health care provider, other individual, etc.) access to the user's secure information via a portable access point. The user can also select scope definitions that control how the user's secure information is shared with the vetted entity. The vetted entity can scan the user's portable access point and request a credential that permits access to the user's secure information via the scanning. For example, the credential can be a non-fungible token (NFT) and the credential can be assigned access privileges that correspond the user's selections.

The vetted entity can then issue one or more data access requests using the credential. The data access request(s) can be authenticated and validated by the secure information manager and the secure information manager can permit the vetted entity scope limited access to the user's secure information. The scope limited access can correspond to the access privileges assigned to the credential. The user can dynamical revoke the access privileges assigned to the credential and/or vetted entity via the user's wireless device. The access privileges assigned to the credential can also include an expiration timer, after which the credential will no longer authenticate with the secure information manager.

Implementations achieve fine grained user controlled access to the user's secure information that is efficient and secure. The user, via the user's portable access point, can efficiently define sharing conditions for the user's secure information. In addition, credential(s) issued from interactions with the user's portable access point and the secure information manager can enforce the user's sharing conditions in a trusted manner. When the issued credential(s) are NFT(s), the blockchain based management of the NFT(s) ensures that the credential is authentic and mitigates against fraudulent attempts to access the user's secure information.

The entities that can scan the user's portable access point and receive a subsequently issued credential can be entities that have undergone a workflow. For example, the vetted entity can be an individual, organization, group of individuals, and the like, and the vetting workflow can include one or more of: identity verification, credential verification (e.g., government credentials, medical credential, financial advisor credentials, etc.), cyber security validation, and any other suitable vetting. After undergoing the vetting workflow, the vetted entity can be issued a token wallet and/or entity credential(s) (e.g., credentials that confirm that a request comes from the vetted entity). The vetted entity can generate a credential request for a credential comprising privileges to access a user's secure information by scanning (via a computing system and scanning component) the user's portable access point.

A portable access point can be visual access point that, when scanned, can permit access to a user's secure information (e.g., stored and managed via a secure information manager). For example, the visual access point can comprise a visual representation of the user linked to the portable access point (e.g., facial image) and encoded information related to the scope of the user's secure information and/or permitted access. The user can configure the portable access point and the encoded information displayed.

For example, the portable access point can be displayed via an information management application executing at the user's wireless device (e.g., smartphone, tablet, etc.) and the user can interact with the information management application and select a sharing scope for the user's secure information. The portable access point can be dynamic such that the user's selections via the information management application generate different versions of the portable access point with different encoded information displays. For example, the user can define a sharing scope that identifies data points of the user's secure information that can be shared with a vetted entity via scanning of the portable access point. The user can also define a sharing scope for a time period over which the user's secure information can be shared with a vetted entity via scanning of the portable access point.

One or more scanning element(s) of the vetted entity's computing system(s) can scan the portable access point and generate a credential request using the information from the portable access point. For example, the credential request can include: one or more entity credentials; identifying information for the user; scope definitions that define the access privileges for the requested credential relative to the user's secure information; and/or credential versions (e.g., a type of non-fungible token). The entity credential(s) can include credentials issued to the entity (e.g., issued to one or more users and/or identities associated with the entity) after the entity is vetted by the vetting workflow. Example entity credential(s) include an access token (e.g., Security Assertion Markup Language (SAML), Open Authorization (OAuth), etc.), one or more cryptographic keys or signatures, and the like. The secure information manager can authenticate the entity credentials provided in a request prior to issuing access credential(s) (e.g., with privileges to access the user's secure information) to the vetted entity.

The credential request from the vetted entity can include a set of information. The set of information can include identifying information for the user, such as: a set of user data that identifies the user (e.g., full name, birthdate, home city, state, and/or zip code, physical appearance, etc.), an image of a government issued document that identifies the user (e.g., driver's license, passport, etc.), biometric information (e.g., fingerprints, eye scan, DNA information, etc.), and other suitable identifying information for the user.

The credential request can also include scope definitions for the requested credential. The scope definitions can define the access privileges for the requested credential relative to the user's secure information. In an example, the user's secure information can be electronic health data segmented based on parameters, and the scope definitions can correspond to limited portions of the user's electronic health data. Example parameters that segment a user's electronic health data include: originating or attributed physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), date of information origination, electronic health record format, other Health Level Seven (HL7) data parameters, or any other suitable health data parameters. The user can define what portions of the user's electronic health data to share via the user's portable access point by providing parameter values that define the scope.

The credential request can be received at the secure information manager. The secure information manager can validate and authenticate the credential request and obtain a credential from a blockchain service in response to the request. For example, the secure information manager can transmit the obtained credential to the vetted entity's computing system(s). The credential can be an NFT managed by a blockchain service, and the vetted entity's computing system(s) can comprise a token wallet affiliated with the vetted entity that stores the NFT.

After the credential is issued to the vetted entity, the vetted entity's computing system(s) can issue data access request(s) using the credential. The data access request can include the issued credential, an identifier for the vetted entity that issued the request, and/or user identifying information. The vetted entity's computing system(s) can transmit the data access request to the secure information manager, and the secure information manager can validate and authenticate the data access request. After the validation and authentication of the data access request, the secure information manager can retrieve scope limited secure user information in response to the data access request, and return the scope limited secure user information to the vetted entity's computing system(s).

Some data access request(s) can define one or more data points of the user's secure information. For example, the user's secure information can be electronic health data segmented based on parameters. The data access request can include specific parameter values that define the scope of the user's secure information requested. The secure information manager can retrieve secure user information that corresponds to the requested data point(s) included in the data access request. At times, the secure information manager can retrieve secure user information that correspond to a portion of the requested data point(s) included in the data access request. For example, where the data access request includes user data point(s) outside the set of scope privileges of the vetted entity/provided credential(s), the secure information manager may retrieve only the portion of the user data point(s) covered by the set of scope privileges.

The secure information manager can manage secure information for any suitable users and manage data access request from any suitable vetted entities. A given vetted entity can be any entity that performs services for the user, such as home services (e.g., home constructure, repair, etc.), automobile services (e.g., repairing the user's car), medical services (e.g., medical services relates to a doctor's office, hospital, emergency room, first responders, etc.), financial services (e.g., accounting, trustee services, financial advising, etc.), technology services (e.g., system administrator services, web hosting, etc.), and the like. In an example, the user's secure information can be electronic health records and the vetted entity can be a health care provider requesting access to the user's electronic health records. In this example, the health care provider can scan the user's portable access point (e.g., via the user's wireless device) and request credential(s) (NFTs) from a secure information manager and a blockchain service. Once the credential request from the health care provider is authenticated and validated, the blockchain service can issue the heath care provider an NFT, or a credential that provides the vetted entity scope limited access to the user's electronic health records.

The user can define which NFT to issue to the health care provider via the information management application executing at the user's wireless device. For example, the user can select one of a first NFT (e.g., vanishing NFT), second NFT (episodic NFT), and/or third NFT (e.g., durable NFT), and the information management application can display a version of the user's portable access point in response to the selection. The version of the user's portable access point can encode the NFT selected by the user for the health care provider. The health care provider can scan the portable access point and issue a credential request to the secure information manager, and the credential request can include the NFT the user selected for the health care provider.

The user can also define the access privileges for the NFT requested via scanning of the portable access point using the information management application. For example, the user can select secure user information data points, segments of data points, parameter values used to group data points, or any other suitable definitions for portioning the user's secure information. The version of the user's portable access point generated in response to the user's selections can encode the access privileges for the NFT defined by the user for the health care provider. The health care provider can scan the portable access point and issue a credential request to the secure information manager, and the credential request can include the access privileges the user defined for the health care provider.

In response to the health care provider's credential request, the blockchain service and/or the secure information manager can issue the health care provider an NFT that corresponds to the NFT the user selected. The NFT can also be assigned the access privileges the user defined for the health care provider. Once the health care provider computing system receives the NFT, the system can issue a data access request to the secure information manager to access the user's electronic health records. To permit the access, the secure information manager can authenticate the NFT via smart contract call(s) to the blockchain service. When the NFT authenticates, the secure information manager can permit the health care provider's system scope limited access to the user's electronic health records, such as access limited to the privileges assigned to the NFT.

The health care provider's access to the user's electronic health records using the issued NFT(s) can be logged. For example, the blockchain service can log historic access to the user's electronic health records at one or more private blockchain(s). The stored logs can support audit(s) of the health care provider's electronic health record access.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for permitting scope limited access to a user's secure information using non-fungible tokens according to an example embodiment. Diagram 100 includes user 102, vetted entity 104, authenticator and data controller 106, credential service 108, and secure data store 110. Vetted entity 104 can issue a request to authenticator and validator 106 for access to user 102's secure information stored at secure data store 110. Vetted entity 104 can be any suitable person, group of people, organization or company, and the like that undergoes a vetting workflow.

Vetted entity 104 comprises computing system(s) associated with the vetted entity. For example, an application at the computing system(s) can permit a registered identity of vetted entity 104 to login to the application. Vetted entity 104 and/or the entity's affiliated identities can be registered with one or more authorities. For example, authenticator and data controller 106 can be part of a secure information manager that manages access to secure data store 110, and vetted entity 104 (and one or more registered identities of the vetted entity) can be registered with authenticator and data controller 106.

User 102 may be collocated (in the same physical location) as the computing system(s) of vetted entity 104, and The computing system(s) of vetted entity 104 can obtain user information from user 102, such as via scanning a portable access point for user 102. The portable access point can be a visual access point for user 102's secure information. For example, the portable access point can include a depiction of user 102, such as a facial image, and encoded information, such as a QR code, barcode, a sequence of symbols (e.g., alphanumeric, hexadecimal, etc.), and any other suitable encoded information. The encoded information can represent: identifying information for user 102; scope definitions corresponding to user 102's secure information; time limitations for access to user 102's secure information; and other suitable information.

Computing system(s) of vetted entity 104 can scan the portable access point for user 102 to generate a credential request for access to the user's secure information stored at secure data store 110. For example, user 102 and computing system(s) of vetted entity 104 can be collocated, the user's portable access point can be carried by user 102 (e.g., displayed via an information management application that executes at the user's wireless device). In other examples, user 102 and vetted entity 104 may be remote from one another.

Upon scanning user 102's portable access point, the computing system(s) of vetted entity 104 can issue a credential request to authenticator and data controller 106 for credential(s) that permit access to the user's secure information stored at secure data store 110. The credential request can include user identifying information obtained from scanning the user's portable access point. Authenticator and data controller 106 can authenticate that the credential request originated via scanning of user 102's portable access point. For example, embedded information from the portable access point can be included in the request and authenticated by authenticator and data controller 106. Authenticator and data controller 106 can also authenticate that the requesting system corresponds to a vetted entity, such as vetted entity 104.

The credential request can also include scope definitions for the scope of the requested access (to the user's secure information). The embedded information from the portable access point can include these scope definitions. Authenticator and data controller 106 can request credential(s) from credential service 108 after authentication of the credential request. The requested credential(s) can be assigned access privileges that correspond to the scope definitions provided in the credential request.

Credential service 108 can issue the credential(s) to vetted entity 104. For example, the issued credential(s) can be NFT(s), and a private blockchain managed at credential service 108 can record the issuance of the NFT(s) to vetted entity 104 (e.g., an identifier that represents vetted entity 104, such as a token wallet identifier). Authenticator and data controller 106 can receive the credential(s) from credential service 108 and provide the credential(s) to vetted entity 104. In another example, credential service 108 can provide the credential(s) directly to vetted entity 104.

After receiving the credential(s), the system(s) of vetted entity 104 can issue a data access request to authenticator and data controller 106 for access to user 102's secure information stored at secure data store 110. The data access request can include the issued credential(s) (e.g., NFT(s)), identifying information for user 102 (e.g., obtained via the portable access point, or any other suitable identifying information), and an identifier of vetted entity 104.

Authenticator and data controller 106 can authenticate the credential(s) included in the data access request and validate the user's identifying information. For example, authenticator and data controller 106 can authenticate that the data access request credential(s) correspond to one or more credentials issued to vetted entity 104. When the provided credential(s) are one or more NFTs, authenticator and data controller 106 can validate the NFT(s) via credential service 108. For example, credential service 108 can include a private blockchain service that manages NFT(s) related to user 102 and permissions to access user 102's secure information stored at secure data store 110. Authenticator and data controller 106 can issue one or more application programming interface (API) calls (e.g., smart contract calls) to credential service 108 to perform the authentication.

In response to these API call(s), credential service 108 can authenticate that the provided NFT(s) are: assigned to vetted entity 104; and correspond to defined scope permissions for user 102's secure information. For example, a private blockchain managed by credential service 108 can include an immutable ledger that records information for assigned NFT(s). The private blockchain can record identifying information for the user whose secure information is scoped by a given NFT (e.g., user 102), the scope definitions that correspond to the given NFT, an entity assigned the given NFT, entity assignment changes for the given NFT, and the like.

Credential service 108 can authenticate the provided NFT(s) against the private blockchain to confirm that vetted entity 104 is assigned the NFT(s). In some implementations, credential service 108 can also provide authenticator and data controller 106 scope definitions recorded at the private blockchain that correspond to the NFT(s) provided in the data access request. The scope definitions can define the portion(s) of the user's secure information that the provided NFT(s) and vetted entity 104 are authorized to access.

Authenticator and data controller 106 can also validate that the user's identifying information from the data access request corresponds to a registered person that has secure information stored at secure data store 108. For example, users can register with authenticator and data controller 106, and the secure information of registered users can be stored at secure data store 110. An information management application service can provide portable access point(s) for registered users so that vetted entity 104 can scan the portable access point(s) to request access to the registered users' secure information stored at secure data store 110.

In response to the authentication of the provided credential(s) and vetted entity 104 and the validation of user 102's identifying information, authenticator and data controller 106 can permit vetted entity 104 scope and time limited access to the user's secure information stored at secure data store 110. For example, the scope and time limitations can be controlled by the scope permissions granted to the provided credential(s). The scope permissions can be limited to a relationship between vetted entity 104 and user 102, or other suitable characteristics of vetted entity 104. In another example, the access can be limited to a duration of time (e.g., days, weeks, months, etc.), after which authenticator and data controller 106 will no longer permit vetted entity 104 access unless another request is issued that includes credential(s) that authenticate via credential service 108.

Figure 2:
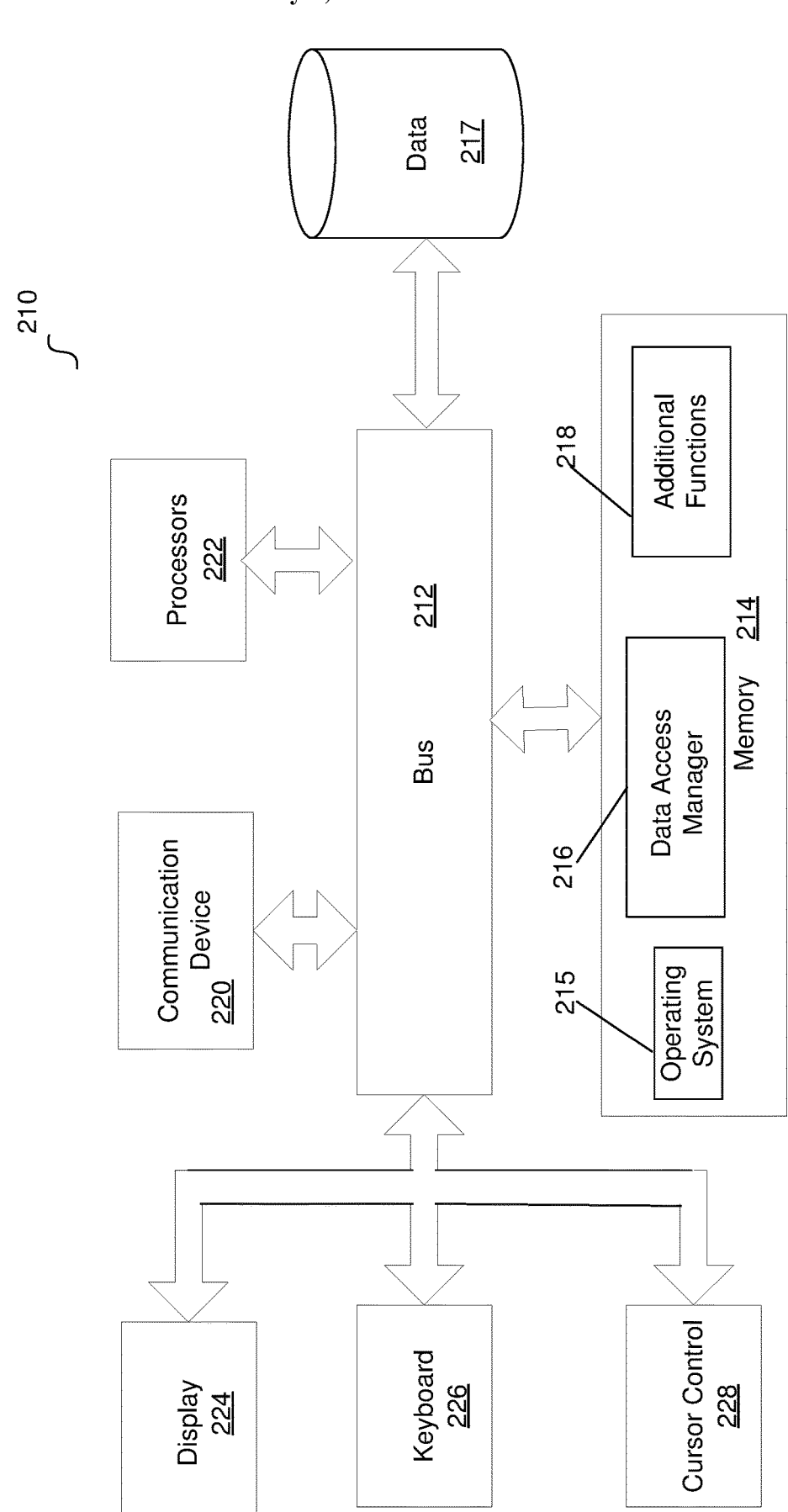
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, migration prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, data access manager 216, as well as other applications modules 218. Operating system 215 provides operating system functionality for system 210. Data access manager 216 may provide system functionality for permitting scope limited access to a user's secure information to a vetted entity, or may further provide any other functionality of this disclosure. In some instances, data access manager 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of Oracle® Data Integrator, Oracle® Cloud Infrastructure, Oracle® Autonomous Database, Oracle® Cerner®, Oracle® Cerner® Millennium, Oracle® Cerner® HealtheIntent, Oracle® Cerner® Seamless Exchange, Oracle® Cerner® HealtheCare, Oracle® Block-chain and Oracle® Cerner® HealtheLife and representative products across the Oracle® Health & Artificial Intelligence platform for example. A database 217 is coupled to bus 212 to provide centralized storage for modules 216 and 218 and to store, for example, registered person validation information, vetted entity information, authentication and validation related information, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), disaster recovery database, backup database, or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
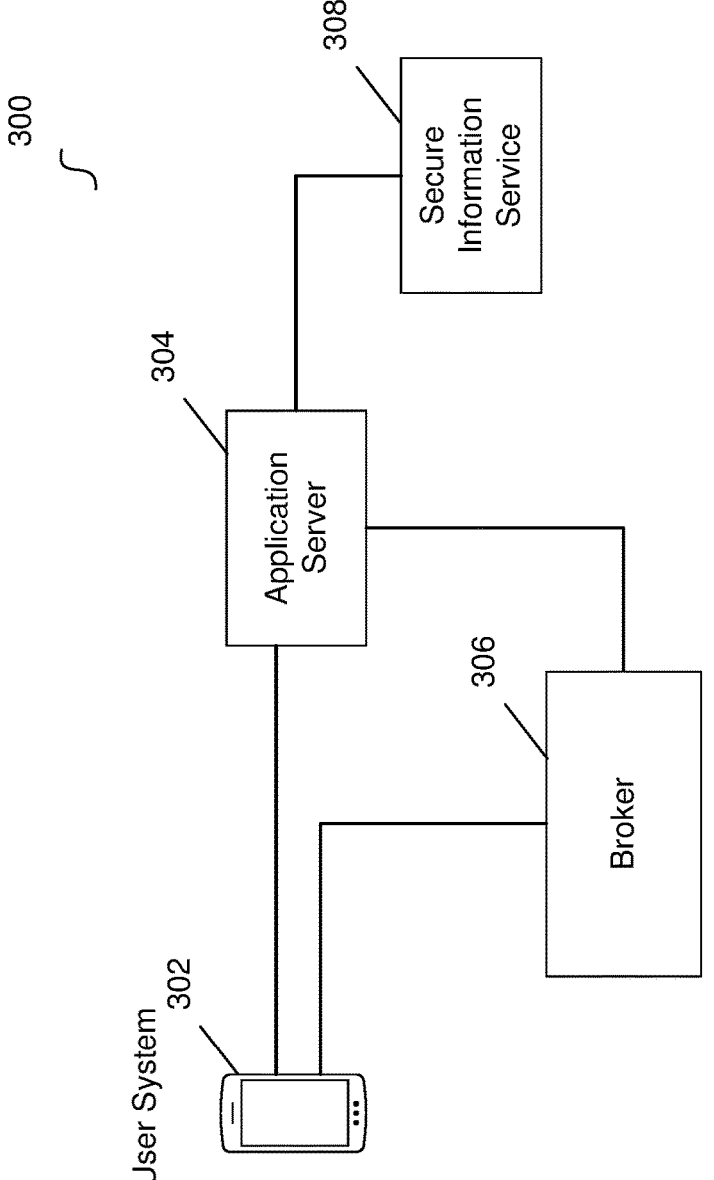
FIG. 3 illustrates a system registering users for secure information management according to an example embodiment.

Before a user's secure information is managed by a secure information managers, users can register via a registration workflow. Once a user is registered with a secure information manager, the registered user can share secure information via portable access point(s) that permit a vetted entity scope limited access to the registered user's secure information. FIG. 3 illustrates a system for registering users for secure information management according to an example embodiment.

Diagram 300 includes user system 302, application server 304, broker 306, and secure information service 308. User system 302 can be any suitable user client device, such as a smartphone, laptop, tablet, and the like. Application server 304 can be any suitable computing device that hosts an application, such as an application displayed to a user via user system 302. For example, the application can be a web application, native application, any combination of these, or any other suitable application.

The user, via user system 302, can interact with the application to register an account. By generating a registered account, the user permits storage and management of the user's secure information by secure information service 308. For example, the registration can configure a user account linked to the user and the user's secure information stored and managed by secure information service 308.

User system 302 can interact with application server 304 and/or broker 306 to perform the registration workflow. Application server 304 and/or broker 306 can be separate from the secure information service 308 in some embodiments. The registration of user(s) via a separate third-party entity (e.g., application server 304 and/or broker 306) can add a level of integrity and trust to the registration workflow.

In some examples, the user's secure information can comprise electronic health records, and the third-party entity can be a government entity, non-profit entity, coalition entity comprised of several individual entities, or any other suitable entity that supports a transparent and trustworthy registration workflow that links electronic health records to users and supports the secure storage of such electronic health records by secure information service 308. In these examples, the third-party entity can act as an intermediary that validates the users' identities, the defined scope(s) of the users' electronic health records stored by secure information service 308, and any other suitable aspects of the users' identity and secure information. The third-party entity can also support connections among different secure information services to ensure the users' electronic health records are available for user inspection and available to the users' medical providers.

To initiate the registration workflow, application server 304 can generate a unique link or registration code for each user (e.g., delivered to user system 302). Using the unique link or code, a user can access the application hosted by application server 304 via user system 302 and perform a registration workflow. In an example, user system 302 can receive a public key to register the user's account. The registration workflow may include the user generating a private key. For example, the private key can be used to manage the user's account and secure information. Any other suitable credentials (e.g., username and password, two factor authentication addresses, shared secret, etc.) can be issued to the user.

To perform the registration workflow, the user provides user identifying information, such as first name, middle name, last name, date of birth, home address, phone number, a photo (e.g., facial image), employment history, city where the user was born, social security number, a user identifier for one or more electronic health records (e.g., identifier for a master patient index), gender, gender identity, ethnicity, and other suitable user information. The user can also provide biometric information (e.g., thumbprint or eye scan) via a biometric scanner to improve the security measures and trustworthiness of the registration workflow and management of the user's secure information.

Broker 306 can validate the user's identifying information and link the registered account created for the user with the user's validated identity. For example, broker 306 can validate that the registered account is permitted to store electronic health records of a person that is validated as the user identity. This validation can prevent fraudulent attempts to access another person's secure information.

Once application server 304 and/or broker 306 perform a first portion of the registration workflow (e.g., receive user identifying information and validate the user's identity), secure information service 308 can generate account components for the user. The account components can include one or more portable access points for the user's secure information, relationship definitions for the user (e.g., defined relationship with other registered users or individuals), and any other suitable account components. Secure information service 308 can also aggregate the user's secure information as part of (or after) the registration workflow. For example, secure information service 308 can retrieve, obtain, or otherwise aggregate the secure information that user authorized secure information service 308 to manage, such as the user's electronic health records.

Figure 5:
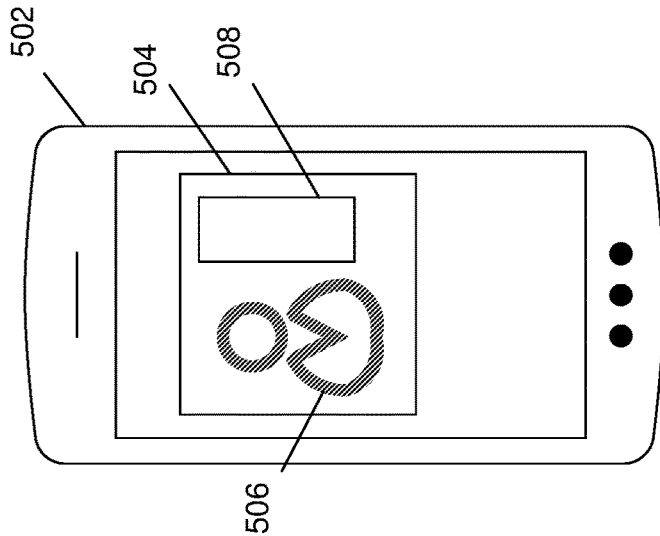
FIG. 5 illustrates a portable access point according to an example embodiment.

The user's registered account can also be linked to one or more portable access points. The portable access point(s) can include a visual representation of the user (e.g., image) and encoded information about the user's secure information, such as scope definitions for sharing the user's secure information. FIG. 5 illustrates portable access point(s) according to embodiments.

Once the registration workflow is complete, the user can login to the generated account via user system 302 and application server 304. The application can be an information management application that permits the user to define a scope for sharing the user's secure information via a generated portable access point. For example, the user can select one or more data points of the user's secure information, one or more default secure information data profiles, or define a scope for sharing the user's secure information in any other suitable manner.

Figure 4A:
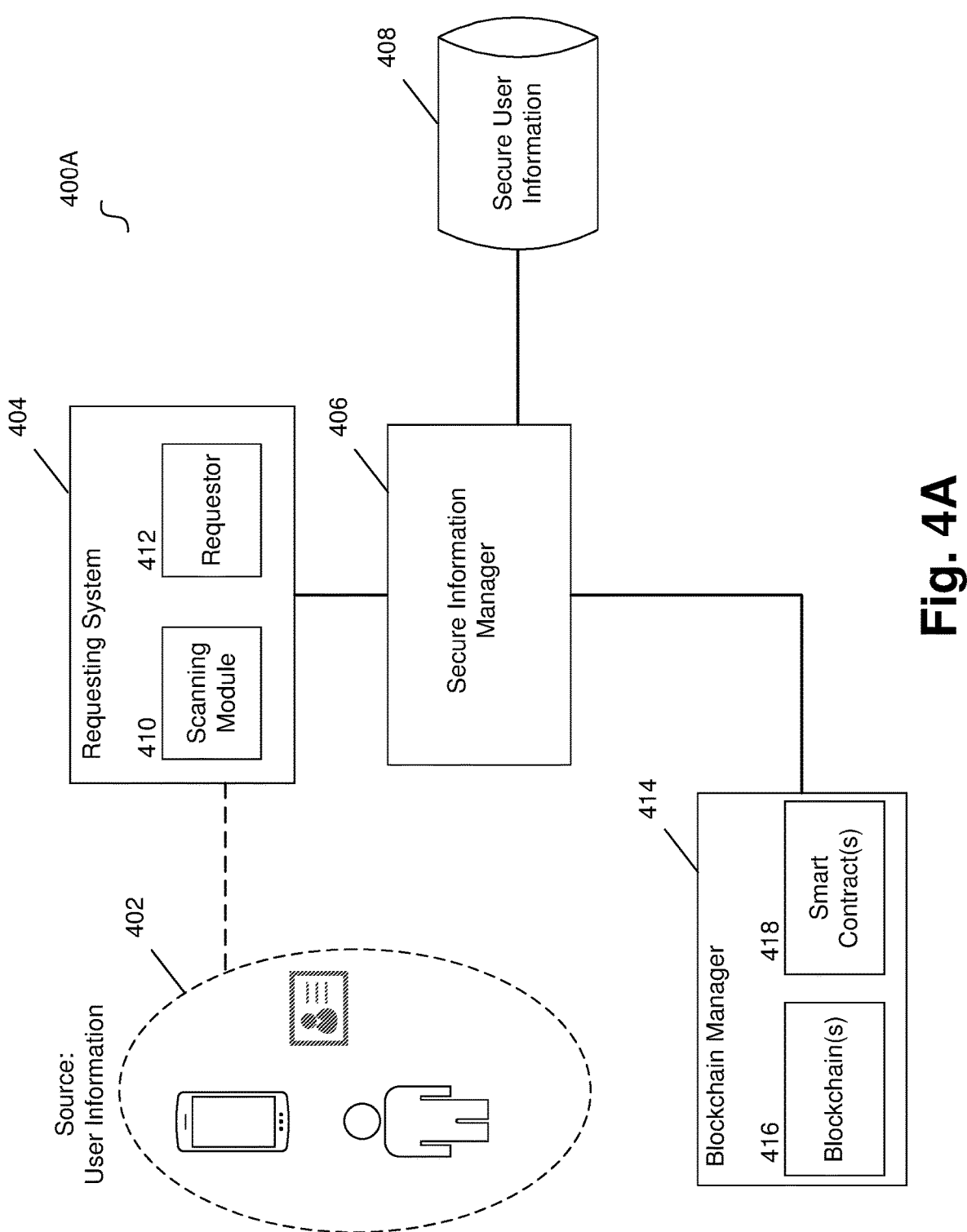
Figure 4B:
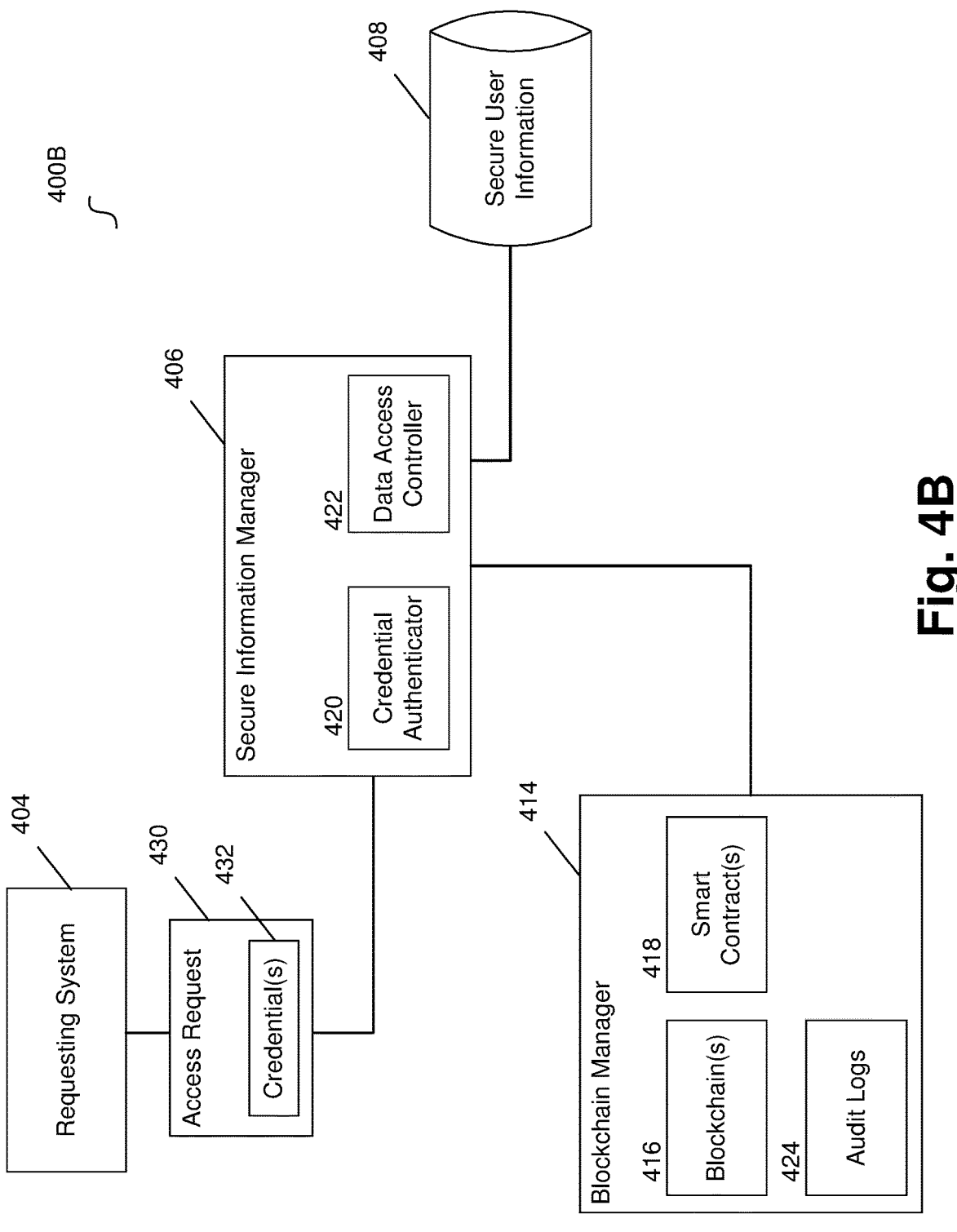
Figure 4C:
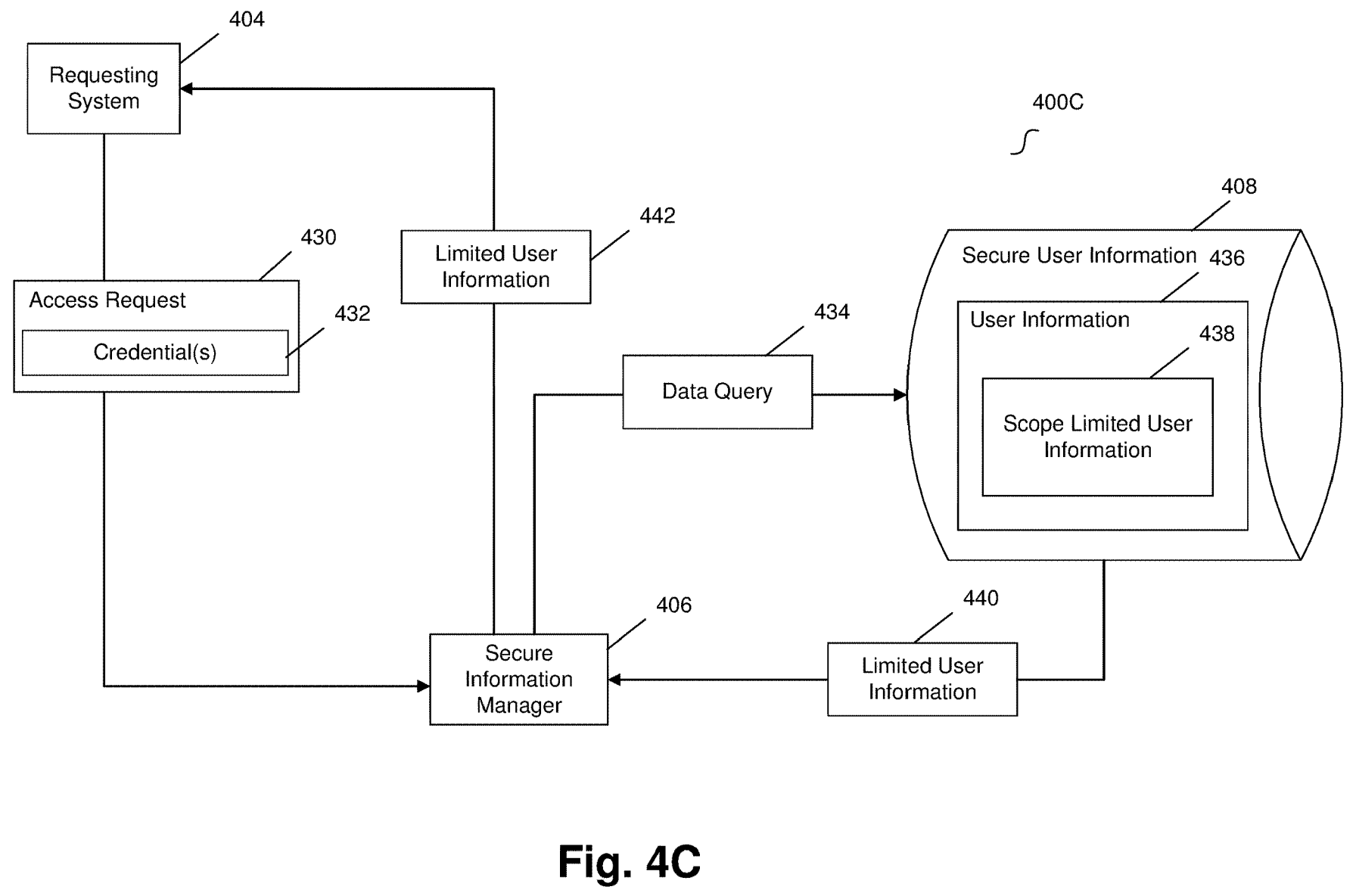

The information management application can generate a portable access point that corresponds to the defined scope and display the portable access point at user system 302. A computing system for an external entity, such as a vetted entity, can scan the portable access point to configure access to the user's secure information according to the defined scope. FIGS. 4A, 4B, and 4C illustrate systems with a secure information manager that permit scope limited access to a user's secure information using non-fungible tokens according to example embodiments.

Diagram 400A includes source 402, requesting system 404, secure information manager 406, secure user information 408, scanning module 410, requestor 412, blockchain manager 414, blockchain(s) 416, and smart contract(s) 418. Requesting system 404 can be a system of a vetted entity, such as an entity that completed a vetting workflow by secure information manager 406. Source 402 can include sources of user information, such as the user's body, user identification documents (e.g., driver's license, passport, etc.), the user's wireless device (e.g., smartphone), a portable access point for the user, and other suitable source(s) of user information.

Requesting system 404 can obtain user information from source 402. For example, scanning module 410 of requesting system 404 can scan the user's portable access point. The user's portable access point can be displayed via the user's wireless device. For example, an information management application (e.g., native application, web application, etc.) executing at the user's wireless device can permit the user to configure a portable access point for sharing the user's secure information. FIG. 5 illustrates portable access point(s) and defining scope restrictions for the portable access points(s) via the information management application according to embodiments. The user's portable access point can also be displayed by the user's wireless device on the lock screen (e.g., prior to inputting a password), in the wireless device's background, as a stored image in the wireless device's photo library, or via any other suitable display means.

Scanning module 410 can be a specialized device configured to scan the portable access point and obtain the identifying user information for a request, such as a wireless device that comprises an image capturing component (e.g., camera) and that executes an application configured to decipher the portable access point. Scanning module 410 can obtain user identifying information from any other suitable elements of source 402.

In some examples, source 402 can include a wireless device of a person that comprises a predefined relationship with the user. The user can be a registered person for whom secure information manager 406 manages secure user information 408. The user can also register predefined relationship(s) with secure information manager 406, such as personal relationships (e.g., parents, spouse, children, friends, etc.), professional relationships (e.g., co-manager of an enterprise application, etc.), or other suitable relationships. The person(s) that comprise predefined relationships with the user can possess wireless device(s) that can provide requesting system 404 identifying information for the user. For example, any suitable user identifying information provided by the user's wireless device (e.g., the user's portable access point) can be provided to scanning module 410 via the wireless device of a person comprising a predefined relationship with the user. The related person(s) wireless device(s) can also comprise an application that is registered with secure information manager 406 and that provides the user identifying information.

In response retrieving information from source 402, requesting system 404 and requestor 412 can issue a credential request to secure information manager 406 for one or more access credential(s) that permit access to the user's secure information. For example, the requested credential(s) can be scope limited to the user identified by the user identifying information (e.g., obtained via source 402). The requested credential(s) can permit requesting system 404 access to secure information 408 via secure information manager 406.

The credential request can also include user identifying information obtained via source 402 and scanning module 412 (e.g., via scanning the user's portable access point), and any other suitable information. User identifying information can include full name, birthdate, social security number, local address and/or zip code, medical information (e.g., primary care physician, etc.), biometric information (e.g., fingerprints, eye scan, etc.), identifier for the user's medical health records (e.g., master-patient index identifier, medical record number, insurance claim identifier, etc.), vehicle make, model, and/or license plate, representations of government issued identification (e.g., driver's license photo), images of the user's face, and the like. In some examples, the user identifying information can be an identifier (e.g., alphanumeric sequence) deciphered from the user's portable access point (e.g., by scanning module 410) and any other suitable user identifying information obtained by scanning of the user's portable access point.

The credential request can also include a credential version. For example, the user can select (via the information management application executing at the user's wireless device) a credential version (e.g., type of NFT with a corresponding expiration timer) and the information management application can generate a portable access point that encodes the credential version. Scanning module 410 can then decipher the credential version and requester 412 can include the credential version in the credential request.

The user may provide a secure user code in order to complete the credential request. For example, the user may be prompted by requesting system 404 to enter a username and password, passcode, key, PIN, or any other suitable secure user code. During a registration workflow the user may establish a username and password, passcode, key, PIN, etc. An application at requesting system 404 may be linked to secure information manager 406, an honest broker, or any other suitable entity that can validate the user's username and password, passcode, key, PIN, etc. Once the application at requesting system 404 confirms that the secure user code is valid, the application can permit requesting system 404 and requestor 412 to generate the credential request.

In order to grant the credential request from requesting system 404, secure information manager 406 can authenticate that requesting system 404 comprises a vetted entity. For example, the credential request from requester 412 can include one or more entity credentials issued to the vetted entity associated with requesting system 404. The entity credential(s) can include an access token (e.g., Security Assertion Markup Language (SAML), Open Authorization (OAuth), etc.), one or more cryptographic keys or signatures, and the like. Secure information manager 406 can authenticate the entity credential(s) included in the credential request and validate user identifying information included in the credential request. For example, secure information manager 406 can authenticate that the entity credential(s) from the request authenticate as credential(s) issued to the vetted entity.

Secure information manager 406 can also validate the user identifying information provided in the credential request. For example, secure information manager 406 can validate that the credential request was generated by scanning the user's portable access point. The validation can include: matching the identifier deciphered from the portable access point with a stored identifier for a registered user; validating that the additional user identifying information provided in the request validates against the user identifying information stored for the matched registered user; validating a credential version included in the credential request; and/or any other suitable validation.

When the entity credential(s) are authenticated and the user identifying information is validated, secure information manager 406 can issue a software call for an access credential on behalf of requesting system 404 (in association with the vetted entity) to blockchain manager 414. For example, blockchain manager 414 can manage NFTs that serve as access credentials for the user's secure information.

Blockchain manager 414 can manage blockchain(s) 416 for secure information manager 406. For example, access credential(s) provided to vetted entities (in response to authenticated and validated credential requests) can include NFT(s) managed by blockchain manager 414. The NFT(s) can be linked to a user's secure information and can be assigned varying levels of scope permissions for accessing the user's secure information. Blockchain(s) 416 can comprise blockchain ledger(s) that record NFT transactions.

A blockchain is a list of records, each called a block, which can be linked through cryptography. In some blockchain implementations, each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains can be difficult to modify because data, once added to the blockchain, cannot be altered without altering subsequent blocks.

Non-Fungible Tokens (NFTs) are blockchain-backed identifiers specifying a unique item. Through a distributed ledger (e.g., blockchain), the assignment or ownership of these tokens can be tracked and verified. Such tokens can include an identifier of the unique item and/or link to a representation of the unique item (e.g., via a traditional URL or a distributed file system such as IPFS). Blockchain manager 418 can manage blockchain(s) 416 and include smart contract(s) 418 that execute in combination with the blockchain(s) 416. Blockchain(s) 416 can be Hyperledger blockchain(s), or any other suitable blockchain(s).

Blockchain manager 414 can manage different NFTs that permit varying levels of access privileges to the user's secure information. For example, a data access request from a vetted entity can be authenticated via blockchain manager 414 and smart contract(s) 418 against blockchain(s) 416 to ensure that: the NFT is an NFT managed by blockchain manager 414, the NFT was issued to the vetted entity that sent the data access request, and/or the NFT is not expired. Diagram 400B of FIG. 4B illustrates an example data access request 430 that includes an NFT issued by blockchain manager 414.

Blockchain manager 414 can also include a minting component that mints the NFTs that permit varying levels of access privileges to the user's secure information. Each minted NFT can include a unique long string identifier that individually identifies the NFT. A minted NFT can comprise information that links the NFT to the user whose secure information that the NFT is assigned privileges to access. The minted NFT can include any suitable user identifying information described herein. The minted NFTs can comprise non-fungible tokens, semi-fungible tokens, and the like.

Blockchain manager 414 can issue one or more NFTs to the vetted entity depending on the smart contract call from secure information manager 406. For example, a first NFT (e.g., vanishing NFT) can provide access to a user's secure information for a limited duration of time (e.g., hours, days, weeks, etc.). In this example, once the limited duration of time expires, the first NFT will no longer authenticate via blockchain manager 414 and blockchain(s) 416. In some examples, the user can define the expiration timer (e.g., via the information management application executing at the user's wireless device) and the definition can be included in the user's portable access point. This defined timer can be included in the credential request issued by requesting system 404 via scanning of the user's portable access point. Secure information manager 406 can then include the defined timer in a smart contract call to blockchain manager 414.

In another example, a second NFT (e.g., episodic NFT) can provide access to a user's secure information for a predefined duration of time (e.g., hours, days, weeks, etc.). In this example, once the predefined duration of time expires, the second NFT will no longer authenticate via blockchain manager 414 and blockchain(s) 416. In another example, a third NFT (e.g., durable NFT) can provide access to a user's secure information permanently or until the NFT is explicitly revoked.

In an example, the user's secure information can be electronic health records and the vetted entity can be a health care provider requesting access to the user's electronic health records. In this example, the health care provider can scan the user's portable access point (e.g., via the user's wireless device) and request credential(s) (NFTs) from blockchain manager 414. Once the credential request from the health care provider is authenticated and validated, the blockchain manager can issue the heath care provider an NFT.

The user can define which NFT to issue to the health care provider via the user's information management application executing at the user's wireless device. For example, the user can select one of the first NFT, second NFT, and/or third NFT, and the information management application can display a version of the user's portable access point in response to the selection. The version of the user's portable access point can encode the NFT selected by the user for the health care provider. The health care provider can scan the portable access point and issue the credential request, which then includes the NFT the user selected for the health care provider.

In this example, the user may select the first NFT (and define a timer) when the user expects that the healthcare provider will need limited access to the user's electronic health records for a short period of time, such as an urgent care facility visit. In another example, the user may select the second NFT when the user expects that the healthcare provider will need access to the user's electronic health records for a moderate period of time, such as a surgery at a hospital the user does not frequent, a specialist visit that the user expects to not reoccur, and the like. In another example, the user may select the third NFT when the user expects that the healthcare provider will need access to the user's electronic health records for a long or indefinite period of time, such as when the health care provider is the user's primary care physician, designated specialist for a long term health issue, and the like.

In other examples, the vetted entity can be another individual, such as an individual with a predefined relationship with the user (e.g., family member, close friend, etc.). The user may select the third NFT in such instances to ensure that the individual maintains access to the user's electronic health records. After secure information manager 406 issues the one or more smart contract calls, blockchain manager 414 can issue one or more NFTs to the vetted entity based on the smart contract call(s).

Blockchain manager 414 can mint NFTs on-demand and/or store a plurality of pre-minted NFTs affiliated with a user. For example, an NFT can be minted on-demand in response to a credential request that comprises: user identifying information, scope privileges that correspond to the credential request, timing restrictions and/or a credential version (e.g., vanishing, episodic, and/or durable), or any other suitable information from the credential request. The minted NFT can then be transferred to the vetted entity identifier from the credential request (e.g., vetted entity's token wallet identifier), and the transfer can be recorded to blockchain(s) 416. The on-demand minted NFT can be crafted for the specific parameters of the credential request. For example, the credential request can be generated in response to user selections at an information management application and/or scanning of a user's portable access point.

In another example, blockchain manager 414 can assign a pre-minted NFT to the entity identified in the credential request. For example, pre-mined NFT(s) can: include predefined scope privileges; correspond to a specific NFT version (e.g., vanishing, episodic, and/or durable); comprise user identifying information that links the NFT to the user; and/or include any other suitable information. Blockchain manager 414 can pre-mint, for a given user, multiple NFTs with different combinations of parameters. For example, multiple NFTs of each NFT version (e.g., vanishing, episodic, and/or durable) can be pre-minted, where the multiple NFTs of a given NFT version can be assigned different predefined scope privileges. Because pre-minted NFTs are not tailored to the specifics of a given credential request, the many different versions of the pre-minted NFTs can accommodate many different credential requests.

For example, the different predefined scope privileges can correspond to: different scope templates the user has defined relative to the user's secure information (e.g., predefined groupings or segments of the user's electronic health data); different templates based on feedback from the vetted entities on what portion(s) of the user's secure information the entities require; a global scope that permits widescale access to the user's secure information; or any other suitable predefined scope privileges. Secure information manager 406 and/or blockchain manager 414 can match one of these pre-minted NFTs to the credential request and assign the matching pre-minted NFT to the vetted entity identified in the credential request.

The pre-minted entities can also comprise a blank set of scope privileges, and secure information manager 406 can assign scope privileges to the NFT that matches the credential request on-demand. Thus, a pre-minted NFT can be matched to the credential request using credential version, and the matching NFT can be assigned scope privileges specifically tailored to the credential request. Secure information manager 406 can communicate the privilege assignments to blockchain manager 414, which can append the privilege assignments to blockchain(s) 416.

Some credential requests from requesting system 404 can be generated by scanning a user's portable access point, such as a portable access point controlled by an information management application at the user's wireless device. The information management application can generate portable access points that correspond to pre-minted NFTs. For example, the information management application can present the user a limited set of scope restrictions and/or a limited set of timing constraints (e.g., credential versions), where each combination of scope restriction and timing constraint corresponds to one of the pre-minted NFTs at blockchain manager 414. In this example, secure information manager 406 and/or blockchain manager 414 can match each credential request to the pre-minted NFT that corresponds to the credential request.

Upon receiving user selections and displaying a portable access point for a user, the information management application at the user's wireless device can also provide secure information manager 406 an indicator that identifies the particular portable access point (e.g., particular combination of scope restrictions and timing constraints) and a time at which the portable access point was displayed. Secure information manager 406 and/or blockchain manager 414 can then mint an NFT on-demand that corresponds to the portable access point definitions and/or select a pre-minted NFT that matches the portable access point definitions. In this example, secure information manager 406 has already selected the NFT for the portable access point definitions in advance of receiving the credential request from requesting system 404. When the credential request is received, the selected NFT can simply be transferred to the vetted entity identified in the credential request.

In this example, a fraudulent use of this version of the user's portable access point at a later point in time can be traced back to the initial time at which this version of the user's portable access point was displayed and the vetted entity that scanned this version of the user's portable access point (and subsequently requested a credential using the deciphered information from this version of the user's portable access point). Such a fraudulent attempt may utilize a static image of the user's portable access point. A fraudster may take a photo of the user's portable access point and, using the photo, later attempt to request a credential that provides access to the user's secure information. Because the version of the user's portable access point identifies a time and a vetted entity that scanned the portable access point, the fraudster can be traced and held accountable. In one embodiment, the version of the user's portable access point changes based on the time that the version was generated, even if other access criteria are the same. In this embodiment, a different version can be generated each time the user prepares the user's portable access point for scanning.

Requesting system 404, of the vetted entity, can then receive the NFT(s) issued via blockchain manager 414. For example, requesting system 404 can comprise an NFT wallet (e.g., issued to the vetted entity upon completion of the vetting workflow) that stores the NFT(s). Requesting system 404 can receive the issued NFT(s) from secure information manager 406 or directly from blockchain manager 414. Once receive, requesting system 404 can include the NFT(s) in a data access request that requests access to the user's secure information.

In another example, requesting system 404 can be the user's wireless device while source information 402 can be affiliated with the vetted entity. The vetted entity can display source information 402 via any suitable display means, such as a computing system (e.g., wireless device, computer monitor, television, etc.), printed on a physical item (e.g., paper, wood, cardboard, etc.), or via any other suitable display. Source information 402 can include an access point for the vetted entity, such as a QR code or other suitable visual code affiliated with the vetted entity. The vetted entity's access point can be similar to the user's portable access point, such as the portable access point disclosed at FIG. 5.

In this example, the vetted entity's access point can include encoded information about the vetted entity, and the user's wireless device, as requesting system 404, can scan the vetted entity's portable access point to decipher the information. The information management application at the user's wireless device, which the user interacts with to select scope permissions for the requested credential, timing for the requested credential, and/or a credential version, can be configured to decipher the vetted entity's portable access point. For example, the information management application can serve as scanning module 410. The vetted entity's encoded information can include an identifier that identifies the vetted entity to secure information manager 406, encoded information that represents an identity credential issued to the vetted entity (e.g., a signature using a cryptographic key), or other suitable vetted entity identifying information. Using the vetted entity information deciphered from the vetted entity's access point, the user's wireless device can generate a credential request and transmit the credential request to secure information manager 406.

For example, the credential request generated by the user's wireless device, as requesting system 404, can include: user identifying information (e.g., stored at the user's wireless device), scope defining information for the requested credential (e.g., selected via the information management application), timing and/or a credential version for the requested credential (e.g., selected via the information management application), vetted entity identifying information deciphered from the entity's access point, and other suitable credential request information.

In response to the credential request from the user's wireless device, secure information manager 406 can provide the vetted entity's system with access credential(s) (e.g., NFT, credential(s) 432 of FIG. 4B) that correspond to the credential request. For example, via interactions with blockchain manager 414, secure information manager 406 can provide credential(s), such as one or more NFTs, with scope permissions that correspond to the credential request.

Blockchain manager 414 can mint an NFT in response to the credential request from the user's wireless device, and this newly minted NFT can be provided to the vetted entity's computing system. In another example, blockchain manager 414 can comprise an existing NFT (previously minted) and blockchain manager 414 (and/or secure information manager 406) can configure this existing NFT in response to the credential request. Configuring the existing NFT can include one or more of: assigning the existing NFT to the vetted entity (e.g., the vetted entity's token wallet), assigning scope privileges to the existing NFT that correspond to the credential request, and the like.

Using the NFT(s) issued to the vetted entity's computing system via a credential request for the user's wireless device, as requesting system 404, the vetted entity's computing system can issue one or more data access requests to secure information manager 406. For example, the data access requests can include: a scope of the requested user secure information; the issued NFT(s); and/or any other suitable information.

Diagram 400B includes requesting system 404, secure information manager 406, secure user information 408, blockchain manager 414, blockchain(s) 416, smart contact(s) 418, audit logs 424, transaction logs 426, access request 430, and credential(s) 432. Similar to an example disclosed with reference to diagram 400A, requesting system 404 can be a system of a vetted entity, such as an entity that performed a vetting workflow by secure information manager 406.

Once the vetted entity has been assigned the credential(s) 432, such as an NFT, the user's wireless device, via the information management application, may display information identifying the vetted entity as the current owner of the NFT that gives the vetted entity permission to access the user's secure information according to the access permissions associated with the NFT. In the same or another embodiment, the user's wireless device, via the information management application, may display a list of all vetted entities that own NFTs that permit access to the user's secure information, and these vetted entities can be grouped by the type, duration, and/or extent of access that each of those vetted entities has with respect to the user's secure information.

Some embodiments also allow the user to group and/or concurrently display NFT-managed data consumers (e.g., vetted entities) with secure access along with non-NFT-managed data consumers with secure access. For example, the user may manually update information about data consumers that have been manually granted access to certain secure user information, and those data consumers may be displayed along with information about NFT-managed data consumers. In one embodiment, the concurrent display includes an option for converting a non-NFT-managed data consumer into an NFT-managed data consumer using a clickable button on the user's wireless device, via the information management application, that triggers the NFT management process described herein to transfer NFT ownership to the previously non-NFT-managed data consumer. For example, a difference between NFT-managed data consumers and non-NFT-managed data consumers is that NFT-managed data consumers may continually, periodically, or on-demand access (and in some embodiments update) secure user information, such electronic health records as new health data is available. The user (or patient) can retain the ability to restrict the scope or duration of this privilege via NFTs; whereas, non-NFT-managed data consumers may access and update health records if the user or patient has manually given them permission to do so. Typically, this is accomplished via a health data request form filled out by the patient and faxed and/or emailed (as of the time of filing, this is still the most common practice) to the data producer for sending to the data consumer.

Requesting system 404, or an NFT-managed data consumer, can issue access request 430 that comprises credential(s) 432, which can be one or more NFT(s) issued to requesting system 404 (and the vetted entity) by blockchain manager 414. Access request 430 can comprise identifying information for the user, such identifying information obtained via scanning the user's portable access point and/or the user's full name, birthdate, social security number, local address and/or zip code, medical information (e.g., primary care physician, etc.), biometric information (e.g., fingerprints, eye scan, etc.), identifier for the user's medical health records (e.g., master-patient index identifier, medical record number, insurance claim identifier, etc.), vehicle make, model, and/or license plate, representations of government issued identification (e.g., driver's license photo), images of the user's face, and the like.

Once access request 430 is received at secure information manager 406, credential authenticator 420 can authenticate credential(s) 432 (e.g., issued NFTs) via one or more to smart contract(s) 418 of blockchain manager 418. Secure information manager 406 can also validate the user's identifying information against registered users to confirm the request identifies a user that matches the issued NFT. After credential(s) 432 are authenticated and the user's identifying information is validated, data access controller 422 can issue one or more queries to secure user information 408 to retrieve the scope limited secure user information.

Secure information manager 408 can log the request(s), scope limited information accessed via the request(s), timestamps, and other suitable data related to access request 430 and the scope limited secure user information accessed. In some implementations, secure information manager 408 can comprise an application log and/or audit logs. For example, application logs can log transactions and activity of an application that permits the scope limited access in response to data access requests (e.g., access request 430). Audit logs can log data similar to the application logs that supports auditing, for example a user audit.

The access to the user's secure information can be logged in any suitable data structure. Blockchain manager 414 can store the audit logs in a blockchain data structure to support an audit. Secure information manager 408 can call one or more smart contract(s) 418 that write log information to audit logs 424. For example, each request and/or instance of permitted access to the user's secure information can be logged as a block of a blockchain via calls to smart contract(s) 418. Application log(s) may also be stored by blockchain manager 414 within a blockchain data structure.

Secure information manager 408 and/or blockchain manager 414 can provide portions of the log(s) in response to an audit request. The user (or any other suitable entity or person) can audit the access to the user's secure information. The logged information, including the request(s), scope limited information accessed via the request(s), timestamps, and other suitable data related to the received request(s) and scope limited data, can be provided to the user or other suitable audit entity.

Diagram 400C of FIG. 4C includes requesting system 404, secure information manager 406, secure user information 408, access request 430, credential(s) 432, data query 434, user information 436, scope limited user information 438, and limited user information 440. Similar to an examples disclosed with reference to diagrams 400A and 400B, requesting system 404 can be a system of a vetted entity, such as an entity that performed a vetting workflow by secure information manager 406.

As disclosed with reference to FIG. 4B, access request 430 and credential(s) 432 can be authenticated and validated via secure information manager 406. Data query 434 can be issued to retrieve scope limited secure user information from secure user information 408, such user information that corresponds to scope privileges of credential(s) 432. Secure user information 408 can include secure information for a number of registered persons and user information 436 can represent the secure information stored for the user who is validated against the identifying information included in access request 430 and/or the user linked to credential(s) 432. Secure information manager 406 can structure data query 434 to retrieve portions of user information 436.

User information 436 may comprise a set of data points for the user and scope limited user information 438 can comprise a subset of the data points. In an example where secure user information 408 comprises electronic health records and user health data, the set of data points of user information 438 can include an aggregate of electronic health record data for the user, and the subset of datapoints of scope limited user information 438 can comprise a portion of the aggregated electronic health data, such as metadata and/or summary data that covers components of the aggregated electronic health record data, a predefined subset of electronic health records (e.g., defined by the user, secure information manager 406, etc.), or any other suitable subset of data.

For example, scope limited user information 438 can be predefined health data points designated by the user as accessible by any suitable vetted entity that comprises authenticated credential(s). In another example, scope limited user information 438 can include health data points based on a predefined template, such as data points tailored for patient intake. Scope limited user information 438 can include user blood type, preexisting health conditions, previous surgeries, allergies, current medications, or any other suitable user health data. In an example where user information 436 is a segmented health record, the data points comprised by scope limited user information 436 can be any suitable segments of the segmented health record.

User information 436 can be electronic health data segmented based on parameters. For example, the parameters can include: originating physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), date of information origination, electronic health record format, other Health Level Seven (HL7) data parameters, or any other suitable health data parameters. The user can define what portions of the user's electronic health data to share via the user's portable access point by providing parameter values that define the scope. The privileges for credential(s) 432 can then be scoped based on the user defined parameters, and secure information manager 406 can limit data query 434 based on the privileges for credential(s) 432.

In response to an authenticated and validated access request 430, secure information manager 406 can issue data query 434 to secure user information 408. Secure information manager 406 can receive, from secure user information 408, limited user information 440, which can be scope limited based on the scope privileges defined for credential(s) 432 (e.g., NFT(s) issued to the vetted entity/ requesting system 404). Data query 434 can be generated in response to the data requested by access request 430, and secure information manager 406 can then limit data query 434 based on the privileges of credential(s) 432. In another example, the data requested by access request 430 can be scope limited according to the privileges of credential(s) 432, and data query 434 can be generated to retrieve the scope limited data. Limited user information 440 can then be provided to requesting system 404.

Role-based access control can also be applied to secure user information 408 to limit and restrict functionality and information scope relative to credential(s) 432 and the identities affiliated with the credential(s) (e.g., the user, the vetted entity, registered users of the vetted entity, etc.). Each identity affiliated with credential(s) 432 can correspond to a role in the context of the role-based access control. For example, an Administrator role may have full permissions to view all information and perform all tasks, whereas a Clerk role may only be able to view limited information about a particular consumer or patient where protected health information (PHI) or personal identifiable information (PII) attributes would be hidden from that individual. In some implementations, role-based access control can be applied to data query 434 such that limited user information 440 is retrieved by the query.

The vetted entity affiliated with credential(s) 432 can include one or more registered identities. For example, the vetted entity can be an organization and the registered identities can be persons that are part of the organization. The vetted entity can be a hospital, emergency room organization, or a first responder organization in some examples, and the registered identities can be emergency room personnel and/or paramedics.

Request 430 may be issued by the registered identity of the vetted entity. For example, request 430 can comprise an indicator of the vetted entity and registered identity, such as credential(s) 432 that, when authenticated, identifies the registered identity and vetted entity. Any other suitable indicator can be included in request 430.

Limited user information 440 can be scoped to the registered identity associated with the vetted entity that issued the request, and/or credential(s) 432 of the vetted entity or registered identity. For example, a paramedic registered identity may not provide the same level of care that an emergency room provider can provide, and therefore differing levels of information may be necessary based on the situation of care. Accordingly, a request from a paramedic registered identity may correspond to a first version of limited user information 440 while a request from emergency room personnel may correspond to a second version of limited user information 440, where the first version is different from the second version. For example, the second version can include data points relevant to certain levels and activities of care that are not included in the first version.

Data access requests from the vetted entity (e.g., requesting system 404) can vary in the registered identity that issues the request, the credential(s) included in the request, the scope of the user's secure information requested, and the other suitable request parameters. For example, requesting system 404 can issues multiple requests, over time, to access the user's secure information using different credential(s) 432. As long as credential(s) 432 are unexpired, secure information manager 406 can authenticate the credential(s) and permit access to the user's secure information (limited in scope to the privileges of credential(s) 432).

The user can edit the privileges assigned to credential(s) 432 via the information management application executing at the user's wireless device. For example, the user's information management application, which controls the user's portable access point and privileges assignments for assigned credential(s) 432, can be linked to secure information manager 406, and the data points, secure user information segments, and/or parameter values used to group the secure user information to which credential(s) 432 are permitted access can be edited. These edits can be stored at secure information manager 406 and/or provided to the blockchain service via a smart contract(s) 418. The blockchain service can append the privilege edits to blockchain ledger(s) that define the access privileges for credential(s) 432.

The edits can include revoking the access privileges assigned to credential(s) 432. When credential(s) 432 expire or the access privileges of the credential(s) are revoked, requesting system 404 can transmit the credential(s) back to the blockchain service that issued the credential(s), for example to be assigned to the same or another vetted entity. In some example, blockchain manager 414 can store multiple pre-minted NFTs, and the credential(s) returned to blockchain manager 414 after expiration and/or revocation can be returned to this pool of pre-minted NFTs (awaiting transfer to a next owner/vetted entity).

The token wallet of the vetted entities that store the credential(s) can be specialized token wallet(s) that return credential(s) 432 to blockchain manager 414 (or any other suitable originated token wallet) when the credential(s) expire. For example, some of credential(s) 432 can be NFTs that defined expiration times, and each token wallet can detect the expiration time and automatically return any expired credential(s) 432. Revocation of credential(s) 432 initiated by the user via the information management application at the user's wireless device can be processed at a predetermined timing interval (e.g., once daily, every 12 hours, every 6 hours, etc.). For example, secure information manager 406 and/or blockchain manager 414 can trigger, at each interval timing, revocation of credential(s) from vetted entity token wallet(s) based on user initiated revocations.

FIG. 5 illustrates a portable access point according to an example embodiment. Diagram 500 includes wireless device 502, portable access point 504, image 506, and encoded information 508. An application running on wireless device 502 can display portable access point 504. For example, the system(s) of a vetted entity can be configured to scan portable access point 504 from wireless device 502. Wireless device 502 can display portable access point 504 in any other suitable manner.

Portable access point 504 can include image 506, or a facial image of the user, and encoded information 508. Encoded information 508 can include a unique QR code or other suitable visual or symbolic (e.g., alphanumeric) code embedded relative to image 506 (e.g., on top of image 506). The QR and/or symbolic code can leverage one or more of a holographic image, a raised holographic image, pixelated code, raised texturized code, and the like. For example, encoded information 508 can be displayed on top of images 506 as an embossed QR code with a unique encrypted long string identifier that is produced using an algorithm.

Encoded information 508 can include a unique encrypted long string identifier generated via an encrypted long string identifier algorithm. The encrypted long string identifier can be unique at least due to the encrypted long string identifier algorithm that produced it. For example, if a fraudulent version of portable access point 504 attempted to replicate the unique encrypted long string identifier, the scanning of the image 506 and encoded information 508 would not match due to the unique algorithm that was used.

The unique encrypted long string identifier generated via an encrypted long string identifier algorithm can be dynamic such that a new identifier is generated: for each version of portable access point 504, over a predefined period (e.g., every 2 hours, 4 hours, 6 hours, 12 hours, daily, etc.), or via any other suitable timing. In this example, a secure information manager that manages the user' secure information can receive the dynamically generated identifier for the version of the portable access point. For example, the identifier can be dynamically generated via the information management application on wireless device 502 that manages the user's portable access points, and the application can transmit the dynamically generated identifier to the secure information manager. In another example, the identifier can be dynamically generated via a cloud service, and the cloud service can transmit the dynamically generated identifier to both the application that manages the user's portable access points and the secure information managers.

To mitigate against fraudulent attempts to request credential(s) via an old version of the user's portable access point, the secure information manager can record the one or more active long string identifier(s) for a given user. When a credential request that comprises an inactive identifier is received by the secure information manager, that request can be denied and the fraudulent attempt can be reported to support enhanced security measures.

A vetted entity system can be configured to scan portable access point 504, such as requesting system 404 and scanning module 410 of FIG. 4A. Once scanning module 410 scans portable access point 504, the requesting system 404 (e.g., an application configured to decipher portable access point 504) can decipher encoded information 508 and/or image 506. For example, the application at requesting system 404 can decipher the unique long string of numbers (e.g., generated by a unique algorithm), and include the deciphered number in a credential request, as described with reference to diagram 400A of FIG. 4A.

The user's secure user information linked to portable access point 504 can be electronic health data segmented based on parameters. For example, the parameters can include: originating or attributed physician and/or medical organization (e.g., entity names or identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), date of information origination, electronic health record format, other Health Level Seven (HL7) data parameters, or any other suitable health data parameters. The user can define what portions of the user's electronic health data to share via portable access point 504 by providing parameter values that define the scope.

For example, via interactions with the application executing at the user's wireless device, the user can specify the following parameter values: originating physician and/or medical organization—ALL; types—medications, tests and results, medical history, family history, biometrics, vaccine information, and allergies; relevant health practices—cardiology, primary care physician, and neurology; date of information origination—ALL; and electronic health record format—ALL. Other example parameter values for date of information include past two years, past year, since the age of 18, custom time range (e.g., Jan. 1-31, 2023), etc. The user's electronic health data that matches the parameter values specified by the user can be scoped for sharing via portable access point 504 and any credential(s) issued that correspond to portable access point 504. Encoded information 508 can include encoded data parameter values that correspond to the user's selections.

Wireless device 502 can display portable access point 504 while the wireless device is offline, such as while wireless device 502 lacks a connection to: the Internet, a server that hosts components of the application that displays portable access point 504, a cellular network and/or wireless local area network, or any other suitable network connection. In this example, components of the application that run locally at wireless device 502 can display portable access point 504.

Portable access point 504 can be displayed on the login screen of the application, such as prior to the user logging in to the application. This can support display of portable access point 504 without a network connection. The scanning component of the vetted entity (e.g., scanning module 410) can then scan the displayed portable access point 504, and the vetted entity's system can leverage a network connection (e.g., connection to the Internet) to perform credential request(s) and/or data access request(s).

Figure 6:
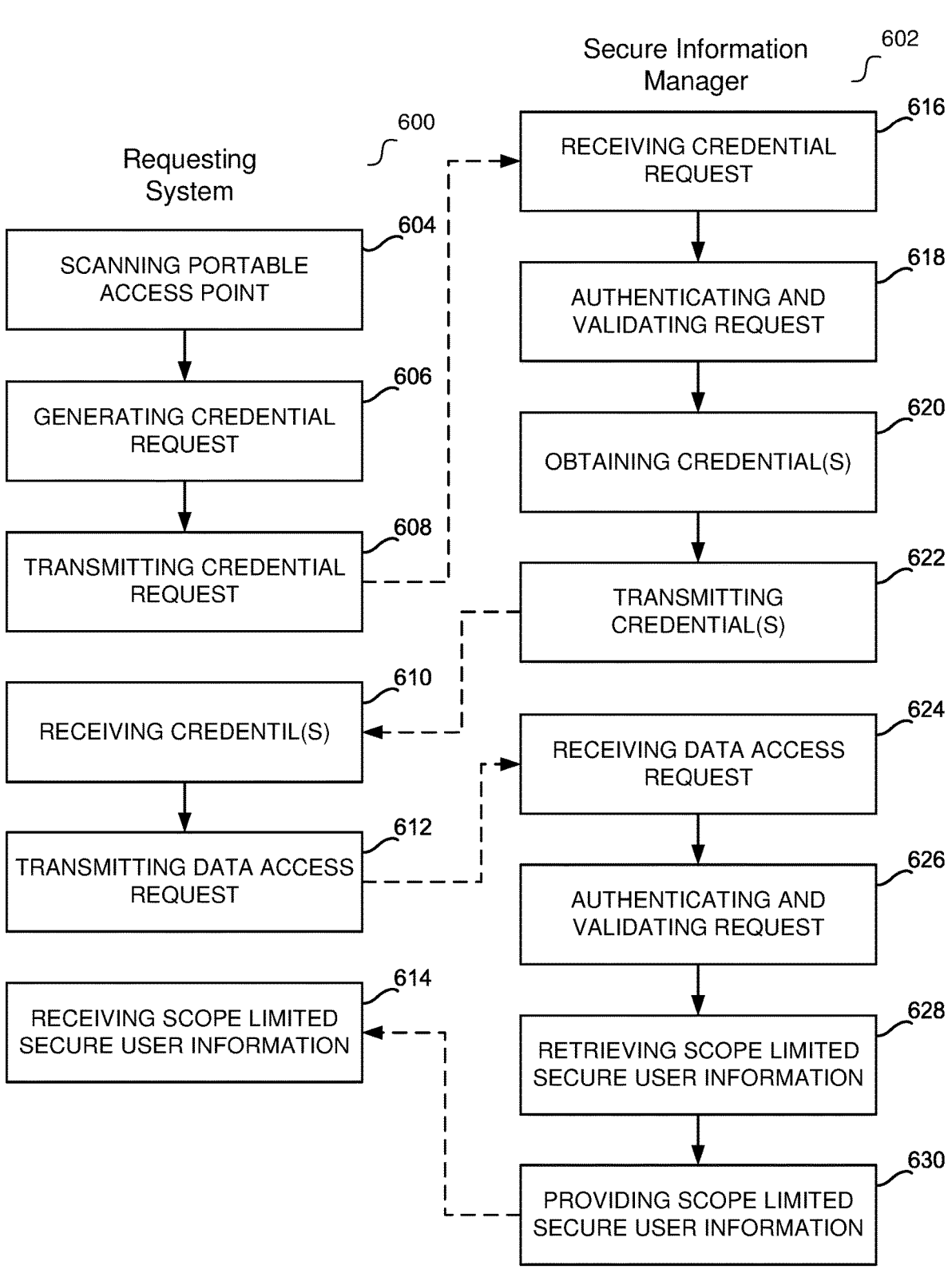
FIG. 6 illustrates a flow diagram for permitting limited access to a user's secure information using credential authentication and user verification according to an example embodiment.

FIG. 6 illustrates a flow diagram for permitting limited access to a user's secure information using credential authentication and user verification according to an example embodiment. In one embodiment, the functionality of FIG. 6 (and FIG. 7 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

Process 600 can be performed by a requesting computing system, such as a computing system affiliated with a vetted entity that issues requests (e.g., credential requests and/or data access requests) to a secure information manager. Process 602 can be performed by a secure information manager (e.g., cloud computing system or any other suitable computing system) that manages secure information for user(s).

At block 604, process 600 can scan a portable access point. For example, a requesting system can include a scanning component configured to scan and decipher a user's portable access point. The scanning component can be a portable device that comprises a camera and software configured to decipher user identifying information from the user's portable access point.

A portable access point can be visual access point that, when scanned, can permit access to a user's secure information (e.g., stored and managed via a secure information manager). For example, the visual access point can comprise a visual representation of the user linked to the portable access point (e.g., facial image) and encoded information related to the scope of the user's secure information and/or permitted access. The requesting system and scanning component can be affiliated with a vetted entity, such as an entity that performed a vetting workflow. Example vetted entities can include service providers (e.g., system administrators, health care providers, hospitals, etc.), partners in a joint venture, a person registered with the secure information manager, or any other suitable vetted entity.

The user can configure the portable access point and the encoded information displayed. For example, the portable access point can be displayed via an information management application executing at the user's wireless device (e.g., smartphone, tablet, etc.) and the user can interact with the information management application and select a sharing scope for the user's secure information. The portable access point can be dynamic such that the user's selections via the information management application generate different versions of the portable access point with different encoded information displays. For example, the user can define a sharing scope that identifies data points of the user's secure information that can be shared with a vetted entity via scanning of the portable access point. The user can also define a sharing scope for a time period over which the user's secure information can be shared with a vetted entity via scanning of the portable access point.

At block 606, process 600 can generate a credential request in response to scanning the portable access point. For example, the requesting system can decipher the user's portable access point and generate a request for one or more credentials using the deciphered information. The encoded information displayed by the portable access point can be deciphered and included in the credential request. Deciphered information from the user's portable access point can include user identifying information, such as full name, birthdate, social security number, local address and/or zip code, medical information (e.g., primary care physician, etc.), biometric information (e.g., fingerprints, eye scan, etc.), identifier for the user's medical health records (e.g., master-patient index identifier), vehicle make, model, and/or license plate, representations of government issued identification (e.g., driver's license photo), images of the user's face, and the like.

The deciphered information from the user's portable access point can also include a scope definition corresponding to the user's secure information. For example, the scope definition can correspond to a credential version, such as a vanishing credential (limited scope of time), episodic credential (predefined scope of time), or a durable credential (valid until revoked). In another example, the scope definition can correspond to limited scope privileges for the requested credential.

The user's secure information can be electronic health data segmented based on parameters, and the limited scope privileges for the requested credential can correspond to limited portions of the user's electronic health data. For example, the parameters can include: originating physician and/or medical organization (e.g., entity identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), date of information origination, electronic health record format, other Health Level Seven (HL7) data parameters, or any other suitable health data parameters. The user can define what portions of the user's electronic health data to share via the user's portable access point by providing parameter values that define the scope.

At block 608, process 600 can transmit the credential request. For example, the requesting system can transmit the credential request to a secure information manager. The requesting system's credential request can be for credential(s) that permit the requesting system access to the user's secure information, which can be managed by the secure information manager. For example, the details of the request (e.g., user identifying information, credential version, defined scope secure user information privileges, etc.) can be provided by the user's portable access point. This permits the user control over how the user's secure information is shared with the requesting system.

The secure information manager can validate and authenticate the credential request and obtain a credential from a blockchain service in response to the request. The authentication and validation of the credential request and subsequent retrieval of the credential from the blockchain service are described with reference to blocks 618 and 620 of process 602. A block 610, process 600 can receive credential(s). For example, the secure information manager can transmit the obtained credential to the requesting system. The credential can be an NFT managed by a blockchain service, and the requesting system can comprise a token wallet affiliated with the vetted entity that stores the NFT.

At block 612, process 600 can transmit a data access request that comprises the received credential(s). For example, a data access request that includes the received credentials, an identifier for the vetted entity that issued the request, and user identifying information can be transmitted to the secure information manager. The secure information manager can validate and authenticate the data access request and retrieve scope limited secure user information in response to the data access request.

The data access request can define one or more data points of the user's secure information. For example, the user's secure information can be electronic health data segmented based on parameters. The data access request can include specific parameter values that define the scope of the user's secure information requested. In addition, the credential issued to the vetted entity and provided in the data access request comprises scope privileges relative to the user's secure information. The authentication and validation of the data access request and subsequent retrieval of the scoped limited secure user information are described with reference to blocks 626 and 628 of process 602.

At block 614, process 600 can receive scope limited secure user information in response to the data access request. For example, the secure information manager can transmit the scope limited user information to the requesting system. The received scope limited user information can correspond to the requested data point(s) included in the data access request. In another example, the received scope limited user information can correspond to a portion of the requested data point(s) included in the data access request. When the data access request includes user data point(s) outside the set of scope privileges of the vetted entity/provided credential(s), the secure information manager may retrieve and return only the portion of the user data point(s) covered by the set of scope privileges.

Process 602 can be performed by a secure information manager the receives request(s) from the requesting system. At block 616, process 602 can receive the credential request. For example, the secure information manager can receive the credential request from the requesting system, as described with reference to block 608 of process 600. The credential request can include user identifying information, an identifier and/or credential of a vetted entity, credential version definition, scope definitions for secure user information, and any other suitable information.

At block 618 process 602 can authenticate and validate the credential request. For example, the credential request can include user identifying information that the secure information manager validates. The secure information manager can manage secure information for a number of registered persons, and the validation can match the user identifying information provided in the credential request to one of the registered persons.

The credential request can also include an identifier and/or identifying credential of a vetted entity, and the secure information manager can authenticate the identifier and/or identifying credential. For example, identifier and/or identifying credential included in the credential request (from a requesting system affiliated with the vetted entity) can include a unique identifier assigned to the vetted entity, cryptographic key and/or digital signature generated via a cryptographic key assigned to the vetted entity, a unique token assigned to the vetted entity, or any other suitable data that can be used to authenticate the vetted entity.

At block 620, process 602 can obtain credential(s) corresponding to the credential request. The validation of the user identifying information can match a registered user to the credential request and the authentication of the identifier/credential can match a vetted entity to the credential request. The secure information manager can then issue a software call to a blockchain service for a credential with scope privileges that permit the matching vetted entity scope limited access to the matching registered user's secure information. For example, the software call can include an identifier for the registered user, an identifier for the vetted entity, and the credential version included in the credential request from the requesting system.

The blockchain service can return an NFT to the secure information manager in response to the software call. For example, the blockchain service can host one or more blockchains that manage NFTs, and the NFTs can be issued to vetted entities to serve as credentials that permit the vetted entities access to secure user information. The issued NFT can match the credential version included in the software call. The transaction issuing the NFT to the vetted entity can be appended to the blockchain(s) such that a record of assignment is maintained as an immutable ledger.

The software call by the secure manager can be a smart contract call and the blockchain service can execute one or more smart contracts to return the NFT in response to the smart contract call. For example, the smart contract execution can issue the NFT to a token well identifier associated with the vetted entity and append the transaction to the managed blockchain(s). The appended transaction can include additional information, such as an expiration timer for the issuance of the token to the vetted entity (e.g., defined by the credential version), identifying information about the vetted entity, identifying information about the user, or any other suitable information.

The secure information manager can assign scope sharing privileges (e.g., scope of secure user information data point(s)) included in the credential request to the NFT. For example, the data points, secure information segments, or other suitable portions of the user's secure information defined via the scope sharing definitions can be assigned as privileges of the NFT returned by the blockchain service and the privilege assignment(s) can be stored by the secure information manager.

In another example, the software call from the secure information manager to the blockchain service for the NFT can include the scope sharing definitions, and the blockchain service can assign the NFT the corresponding privileges to access the user's secure information. For example, the blockchain service can append the scope sharing definitions (via execution of smart contract(s)) to the blockchain(s) as part of the recorded transaction(s).

At block 622, process 602 can transmit the credential(s). For example, the secure information manager can send the obtained credential(s) to the requesting system. Alternatively, the blockchain service can transmit the credential(s) directly to the requesting system via a separate communication channel.

At block 624, process 602 can receive a data access request. For example, the secure information manager can receive a data access request with one or more credentials from the requesting system, as described with reference to block 612 of process 600. The data access request can include a credential (e.g., NFT), an identifier for the vetted entity that issued the request, user identifying information, one or more requested data points of a user's secure information, and any other suitable information.

At block 626, process 602 can authenticate and validate the data access request. For example, the data access request can include a credential, such as an NFT. The secure information manager can authenticate the NFT via a software call to the blockchain service. For example, the blockchain service can return trusted information about the NFT from the blockchain(s) that record transactions for the NFT, such as: the vetted entity assigned the NFT, the registered user to which the NFT privileges apply, the expiration time for the NFT, the data points that the NFT is privileged to access, or any other transaction information stored by the blockchain(s). The secure information manager can authenticate the data access request when the expiration timer has not expired and the vetted entity assigned the NFT matches the identifier for the vetted entity that issued the request.

The data access request can also include an identifier for the vetted entity that issued the request, and the secure information manager can validate that the identifier for the vetted entity included in the data access request matches the vetted entity returned by the blockchain service. In addition, the data access request can include user identifying information that identifies a user, and the secure information manager can validate that the user information matches: one of the registered persons managed by the secure information manager, the user affiliated with the NFT returned by the blockchain service, or any combination thereof.

At block 628, process 602 can retrieve scope limited secure information in response to the data access request. For example, the secure information manager can query a secure data store that stores the user's secure information for the user information requested in the data access request.

The secure information manager can, in response to an authenticated and validated data access request, generate a data query that retrieves scope limited secure user information from a secure data store. For example, the data query can be scope limited based on the scope privileges assigned to the authenticated credential. In addition, the data query can be generated in response to the data requested by access request, and the secure information manager can then limit the data query based on the privileges of the provided credential. In another example, the secure user information requested by the data access request can be scope limited according to the privileges of the provided credential, and the data query can be generated to retrieve the scope limited data. The secure data store can then return the scope limited secure user information in response to the data query.

At block 630, process 602 can provide the scope limited secure user information to the requesting system. For example, the secure information manager can return the secure user information requested by the data access request or a scope limited version of the secure user information requested by the data access request, such as when the provided credential does not have access privileges for the entirety of the secure user information requested by the data access request.

Figure 7:
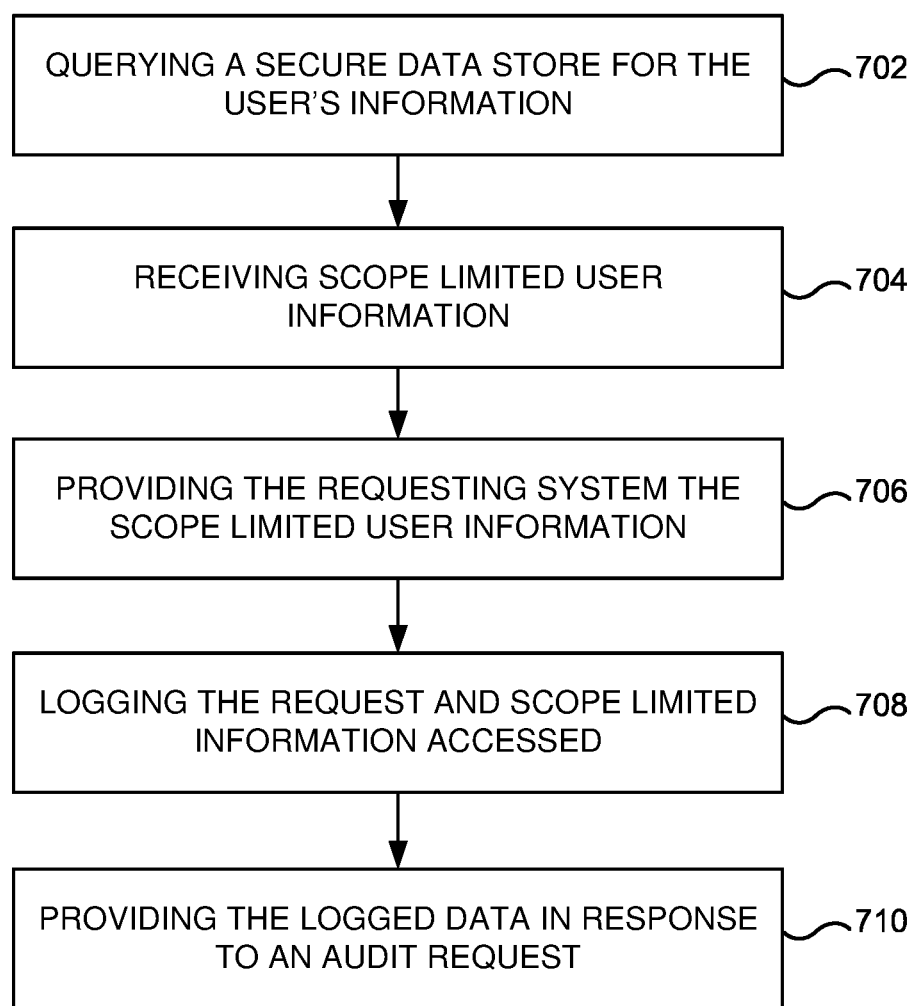
FIG. 7 illustrates a flow diagram for retrieving scope limited user information from a secure data store and logging the access according to an example embodiment.

FIG. 7 illustrates a flow diagram for retrieving scope limited user information from a secure data store and logging the access according to an example embodiment. Process 700 can be performed by: a secure information manager that has permitted a vetted entity access to a user's secure information, for example in response to a request from the vetted entity's computing system; one or more components of a secure data store; one or more components of blockchain service; or any combination thereof.

At block 702, process 700 can query a secure data store for the user's secure information. For example, a vetted entity can request a set of data points for a user's secure information. A data store query (e.g., SQL, any other suitable database query) can be generated that queries for all or a portion of the vetted entity's requested data points of the user's secure information. For example, the data store query can be limited to the privileges of the vetted entity (e.g., a credential assigned to the vetted entity).

At block 704, process 700 can receive scope limited user information from the secure data store. For example, the scope limited user information can be limited by the formulated data store query or by the data store itself. The generated query can be limited to request a limited scope of the user's secure information that the vetted entity is permitted to access. In addition, or alternatively, the data store can return scope limited data points of the user's secure information that are limited to the data points that the vetted entity is permitted to access.

At block 706, process 700 can provide the scope limited user information to the requesting system of the vetted entity. For example, the returned scope limited data points of the user's secure information can be transmitted to the vetted entity's computing system that issued the request.

At block 708, process 700 can log the request(s), scope limited information accessed via the request(s), timestamps, and other suitable data related to the received request(s) and scope limited data. For example, the access to the user's secure information can be logged in any suitable data structure. In some implementations, the storage structure comprises a blockchain, and each request and/or instance of permitted access to the user's secure information is logged as a block of the blockchain.

At block 710, process 700 can provide the logged data in response to an audit request. For example, the user (or any other suitable entity or person) can be permitted to audit the access to the user's secure information. The logged information, including the request(s), scope limited information accessed via the request(s), timestamps, and other suitable data related to the received request(s) and scope limited data can be provided to the user or other suitable audit entity.

Embodiments permit scope limited access to a user's secure information using non-fungible tokens. A user can register with a secure information manager and control the scope with which the user's secure information is shared. The user can permit a vetted entity (e.g., service provider, health care provider, other individual, etc.) access to the user's secure information via a portable access point. The user can also select scope definitions that control how the user's secure information is shared with the vetted entity. The vetted entity can scan the user's portable access point and request a credential that permits access to the user's secure information via the scanning. For example, the credential can be a non-fungible token (NFT) and the credential can be assigned access privileges that correspond the user's selections.

The vetted entity can then issue one or more data access requests using the credential. The data access request(s) can be authenticated and validated by the secure information manager and the secure information manager can permit the vetted entity scope limited access to the user's secure information. The scope limited access can correspond to the access privileges assigned to the credential. The user can dynamical revoke the access privileges assigned to the credential and/or vetted entity via the user's wireless device. The access privileges assigned to the credential can also include an expiration timer, after which the credential will no longer authenticate with the secure information manager.

Implementations achieve fine grained user controlled access to the user's secure information that is efficient and secure. The user, via the user's portable access point, can efficiently define sharing conditions for the user's secure information. In addition, credential(s) issued from interactions with the user's portable access point and the secure information manager can enforce the user's sharing conditions in a trusted manner. When the issued credential(s) are NFT(s), the blockchain based management of the NFT(s) ensures that the credential is authentic and mitigates against fraudulent attempts to access the user's secure information.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method for permitting limited access to a user's secure information, the method comprising:
   receiving, at a secure information manager, a credential request for one or more credentials that permit access to a user's secure information, the credential request comprising user identifying information, entity identifying information, and a credential definition, the credential request generated in response to a visual scanning of a portable access point that corresponds to the user;

validating, at the secure information manager, the user identifying information and the entity identifying information;

assigning, to an entity corresponding to the entity identifying information, and in response to the validating, a non-fungible token that corresponds to the credential definition, wherein the assignment of the non-fungible token to the entity is recorded on a private blockchain that manages the non-fungible token; and permitting, in response to one or more access requests from the entity that comprises the assigned non-fungible token, scope limited access to the user's secure information corresponding to access permissions of the non-fungible token assigned to the entity.

2. The method of claim 1, wherein permitting scope limited access to the user's secure information further comprises:

receiving, at a secure information manager, the one or more access requests, the access requests comprising an unauthenticated credential;

authenticating, via the private blockchain, the unauthenticated credential as the non-fungible token assigned to the entity; and permitting, in response to the authenticating, the scope limited access to the user's secure information corresponding to access permissions of the non-fungible token.

3. The method of claim 1, wherein the entity comprises a vetted entity that is vetted after performance of a vetting workflow.

4. The method of claim 1, wherein the scope limited access to the user's secure information comprises access to scope limited data points of the user's secure information, the scope limited data points comprising a predefined correspondence to the access permissions for the non-fungible token assigned to the entity.

5. The method of claim 1, wherein the scope limited access to the user's secure information provided by the assigned non-fungible token comprises access to the user's secure information for a limited duration of time, the limited duration of time corresponding to the access permissions for the non-fungible token assigned to the entity.

6. The method of claim 1, wherein, the credential request received at a secure information manager is transmitted by a computing system of the entity, the computing system of the entity generates the credential request by scanning the portable access point of the user that encodes at least a portion of the user identifying information and a credential version, and the portion of the user identifying information and the credential definition are obtained by the computing system of the entity via scanning of the portable access point.

7. The method of claim 6, wherein the user selects the credential definition via input at a wireless device, and the wireless device generates the portable access point in response the selection of the credential definition.

8. The method of claim 1, further comprising:

storing one or more logs of the scope limited access to the user's secure information, the logs comprising one or more of: an identifier for the entity, portions of the credential request, the user's secure information accessed by the entity, timestamps for the accessing of the user's secure information accessed, or any combination thereof, wherein the one or more logs are recorded as blocks of an immutable blockchain.

9. The method of claim 8, further comprising:

providing, in response to an audit request from the user, at least a portion of the one or more stored logs.

10. A non-transitory computer readable medium having instructions stored thereon that, when executed by a processor, cause the processor to permit limited access to a user's secure information, wherein, when executed, the instructions cause the processor to:

receive, at a secure information manager, a credential request for one or more credentials that permit access to a user's secure information, the credential request comprising user identifying information, entity identifying information, and a credential definition, the credential request generated in response to a visual scanning of a portable access point that corresponds to the user;

validate, at the secure information manager, the user identifying information and the entity identifying information;

assign, to an entity corresponding to the entity identifying information, and in response to the validating, a non-fungible token that corresponds to the credential definition, wherein the assignment of the non-fungible token to the entity is recorded on a private blockchain that manages the non-fungible token; and permit, in response to one or more access requests from the entity that comprises the assigned non-fungible token, scope limited access to the user's secure information corresponding to access permissions of the non-fungible token assigned to the entity.

11. The non-transitory computer readable medium of claim 10, wherein permitting scope limited access to the user's secure information further comprises:

receiving, at a secure information manager, the one or more access requests, the access requests comprising an unauthenticated credential;

authenticating, via the private blockchain, the unauthenticated credential as the non-fungible token assigned to the entity; and permitting, in response to the authenticating, the scope limited access to the user's secure information corresponding to access permissions of the non-fungible token.

12. The non-transitory computer readable medium of claim 10, wherein the entity comprises a vetted entity that is vetted after performance of a vetting workflow.

13. The non-transitory computer readable medium of claim 10, wherein the scope limited access to the user's secure information comprises access to scope limited data points of the user's secure information, the scope limited data points comprising a predefined correspondence to the access permissions for the non-fungible token assigned to the entity.

14. The non-transitory computer readable medium of claim 10, wherein the scope limited access to the user's secure information provided by the assigned non-fungible token comprises access to the user's secure information for a limited duration of time, the limited duration of time corresponding to the access permissions for the non-fungible token assigned to the entity.

15. The non-transitory computer readable medium of claim 10, wherein, the credential request received at a secure information manager is transmitted by a computing system of the entity, the computing system of the entity generates the credential request by scanning the portable access point of the user that encodes at least a portion of the user identifying information and a credential version, and the portion of the user identifying information and the credential definition are obtained by the computing system of the entity via scanning of the portable access point.

16. The non-transitory computer readable medium of claim 15, wherein the user selects the credential definition via input at a wireless device, and the wireless device generates the portable access point in response the selection of the credential definition.

17. The non-transitory computer readable medium of claim 10, wherein the instructions further cause the processor to:

store one or more logs of the scope limited access to the user's secure information, the logs comprising one or more of: an identifier for the entity, portions of the credential request, the user's secure information accessed by the entity, timestamps for the accessing of the user's secure information accessed, or any combination thereof, wherein the one or more logs are recorded as blocks of an immutable blockchain.

18. The non-transitory computer readable medium of claim 17, wherein the instructions further cause the processor to:

provide, in response to an audit request from the user, at least a portion of the one or more stored logs.

19. A system for permitting limited access to a user's secure information, the system comprising:

a processor; and a memory storing instructions for execution by the processor, the instructions configuring the processor to:

receive, at a secure information manager, a credential request for one or more credentials that permit access to a user's secure information, the credential request comprising user identifying information, entity identifying information, and a credential definition, the credential request generated in response to a visual scanning of a portable access point that corresponds to the user;

validate, at the secure information manager, the user identifying information and the entity identifying information;

assign, to an entity corresponding to the entity identifying information, and in response to the validating, a non-fungible token that corresponds to the credential definition, wherein the assignment of the non-fungible token to the entity is recorded on a private blockchain that manages the non-fungible token; and permit, in response to one or more access requests from the entity that comprises the assigned non-fungible token, scope limited access to the user's secure information corresponding to access permissions of the non-fungible token assigned to the entity.

20. The system of claim 19, wherein permitting scope limited access to the user's secure information further comprises:

receiving, at a secure information manager, the one or more access requests, the access requests comprising an unauthenticated credential;

authenticating, via the private blockchain, the unauthenticated credential as the non-fungible token assigned to the entity; and permitting, in response to the authenticating, the scope limited access to the user's secure information corresponding to access permissions of the non-fungible token.

* * * * *